(12) United States Patent
Sharifi et al.

(10) Patent No.: US 11,880,559 B2
(45) Date of Patent: *Jan. 23, 2024

(54) CONFIDENCE LEVEL BASED CONTROLS ON A SECOND DEVICE

(71) Applicant: Google LLC, Mountain View, CA (US)

(72) Inventors: Matthew Sharifi, Kilchberg (CH); Victor Carbune, Zürich (CH)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/811,973

(22) Filed: Jul. 12, 2022

(65) Prior Publication Data

US 2022/0342537 A1    Oct. 27, 2022

Related U.S. Application Data

(63) Continuation of application No. 16/951,967, filed on Nov. 18, 2020, now Pat. No. 11,402,984.

(51) Int. Cl.
*G06F 3/04847* (2022.01)
*H04B 17/318* (2015.01)
*G06F 3/0482* (2013.01)
*G06F 3/16* (2006.01)
*H04W 4/02* (2018.01)

(52) U.S. Cl.
CPC ........ *G06F 3/04847* (2013.01); *G06F 3/0482* (2013.01); *G06F 3/167* (2013.01); *H04B 17/318* (2015.01); *H04W 4/023* (2013.01)

(58) Field of Classification Search
CPC ... H04W 4/02; G06Q 20/308; G06F 3/04883; G06F 3/04842; H04N 21/43615; H04N 21/4131

See application file for complete search history.

(56) References Cited

U.S. PATENT DOCUMENTS

| 10,042,445 | B1* | 8/2018 | Boelter | G06F 3/04845 |
| 2008/0177734 | A1* | 7/2008 | Schwenke | G06F 16/9038 |
| | | | | 707/999.005 |
| 2011/0313657 | A1* | 12/2011 | Myllymaki | G01C 21/3682 |
| | | | | 701/438 |
| 2013/0113993 | A1 | 5/2013 | Dagit, III | |

(Continued)

*Primary Examiner* — Sang H Kim
(74) *Attorney, Agent, or Firm* — Honigman LLP; Brett A. Krueger; Grant Griffith

(57) ABSTRACT

A method includes obtaining proximity information for each of a plurality of assistant-enabled devices within an environment of a user device. Each assistant-enabled device is controllable by an assistant application to perform a respective set of available actions associated with the assistant-enabled device. For each assistant-enabled device, the method also includes determining a proximity score based on the proximity information indicating a proximity estimation of the corresponding assistant-enabled device relative to the user device. The method further includes generating, using the proximity scores determined for the assistant-enabled devices, a ranked list of candidate assistant-enabled devices, and for each corresponding assistant-enabled device in the ranked list, displaying, in a graphical user interface (GUI), a respective set of controls for performing the respective set of actions associated with the corresponding assistant-enabled device.

20 Claims, 10 Drawing Sheets

(56) References Cited

U.S. PATENT DOCUMENTS

| | | | |
|---|---|---|---|
| 2015/0019342 A1 | 1/2015 | Gupta | |
| 2016/0027278 A1* | 1/2016 | McIntosh | G08B 21/0423 |
| | | | 715/741 |
| 2016/0117076 A1 | 4/2016 | Kim et al. | |
| 2017/0064073 A1* | 3/2017 | Spencer | H04M 1/72415 |
| 2017/0295466 A1* | 10/2017 | Strutt | H04W 4/70 |
| 2018/0025122 A1* | 1/2018 | Schuurkamp | G16H 40/67 |
| | | | 345/440 |
| 2018/0227193 A1 | 8/2018 | Singamsetty et al. | |
| 2018/0227354 A1 | 8/2018 | Gold | |
| 2019/0129607 A1 | 5/2019 | Saurabh et al. | |
| 2019/0208024 A1* | 7/2019 | Jablonski | G06Q 20/308 |
| 2019/0334997 A1* | 10/2019 | Yang | H04L 41/0869 |
| 2020/0169427 A1* | 5/2020 | Wu | H04N 21/44008 |
| 2020/0204673 A1 | 6/2020 | Barathan et al. | |

\* cited by examiner

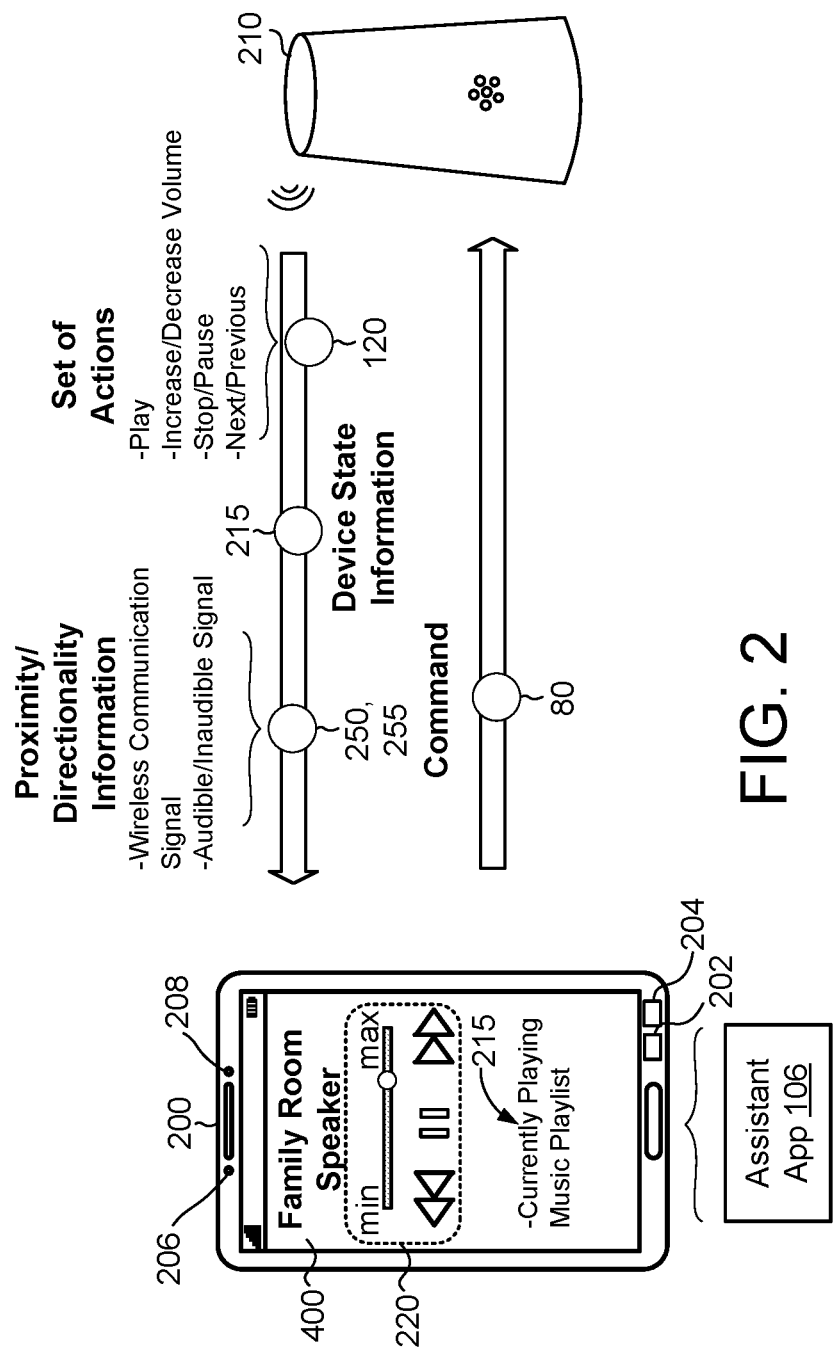

500 — obtaining, by data processing hardware of a user device, proximity information for each of a plurality of assistant-enabled devices within an environment of the user device, each assistant-enabled device of the plurality of assistant-enabled devices controllable by an assistant application to perform a respective set of available actions associated with the assistant-enabled device; 510 for each assistant-enabled device of the plurality of assistant-enabled devices, determining, by the data processing hardware, a proximity score based on the proximity information obtained for the corresponding assistant-enabled device, the proximity score indicating a proximity estimation of the corresponding assistant-enabled device relative to the user device in the environment; 520 generating, by the data processing hardware, using the plurality of proximity scores determined for the plurality of assistant-enabled devices, a ranked list of candidate assistant-enabled devices from the plurality of assistant-enabled devices; and 530 for each of one or more corresponding assistant-enabled devices in the ranked list of candidate assistant-enabled devices, displaying, by the data processing hardware, in a graphical user interface (GUI) displayed on a screen in communication with the data processing hardware, a respective set of controls for performing the respective set of actions associated with the corresponding assistant-enabled device. 540

FIG. 5

CONFIDENCE LEVEL BASED CONTROLS ON A SECOND DEVICE

CROSS REFERENCE TO RELATED APPLICATIONS

This U.S. patent application is a continuation of, and claims priority under 35 U.S.C. § 120 from, U.S. patent application Ser. No. 16/951,967, filed on Nov. 18, 2020. The disclosure of this prior application is considered part of the disclosure of this application and is hereby incorporated by reference in its entirety.

TECHNICAL FIELD

This disclosure relates to proximity-based controls on a second device.

BACKGROUND

An individual can, within their environment, have numerous connected devices that can be controlled by various applications. Such connected devices can include, for example, a smart light bulb, a smart television, a smart speaker, a smart thermostat, a smart security system, or any smart appliance (e.g., a smart oven) that is configured to perform a respective set of actions. In some instances, a particular application can be provided to the user for controlling a particular connected device. However, to control the connected device, the user must identify the application from a multitude of applications running on the user device, select the application to control the particular connected device, then navigate within the particular application to control the connected device. Managing multiple controls for controlling each of the connected devices from a single user device can become disorganized and cumbersome. Additionally, many connected devices can perform overlapping respective sets of actions, making it difficult to discern which connected device a user's command is directed toward.

SUMMARY

One aspect of the disclosure provides a method for controlling assistant-enabled devices. The method includes obtaining, by data processing hardware of a user device, proximity information for each of a plurality of assistant-enabled devices within an environment of the user device. Each assistant-enabled device of the plurality of assistant-enabled devices is controllable by an assistant application to perform a respective set of available actions associated with the assistant-enabled device. For each assistant-enabled device of the plurality of assistant-enabled devices, the method also includes determining, by the data processing hardware, a proximity score based on the proximity information obtained for the corresponding assistant-enabled device. The proximity score indicates a proximity estimation of the corresponding assistant-enabled device relative to the user device in the environment. The method further includes generating, by the data processing hardware, using the plurality of proximity scores determined for the plurality of assistant-enabled devices, a ranked list of candidate assistant-enabled devices from the plurality of assistant-enabled devices, and for each of one or more corresponding assistant-enabled devices in the ranked list of candidate assistant-enabled devices, displaying, by the data processing hardware, in a graphical user interface (GUI) displayed on a screen in communication with the data processing hardware, a respective set of controls for performing the respective set of actions associated with the corresponding assistant-enabled device.

Implementations of the disclosure may include one or more of the following optional features. In some implementations, the method further includes receiving, at the data processing hardware, a user request from a user of the user device requesting to launch the assistant application for execution on the data processing hardware. In these implementations, obtaining the proximity information for each of the plurality of assistant-enabled devices occurs during execution of the assistant application on the data processing hardware. In additional implementations, receiving the user request includes one of: receiving, in the GUI displayed on the screen, a user input indication indicating selection of a graphical element representing the assistant application; receiving a speech input from the user that includes an invocation command to launch the assistant application for execution on the data processing hardware; or detecting a predefined movement/pose of the user device configured to launch the assistant application for execution on the data processing hardware.

In some examples, obtaining the proximity information for at least one assistant-enabled device of the plurality of assistant-enabled devices within the environment of the user device includes receiving, at a sensor of the user device, a wireless communication signal transmitted from the at least one assistant-enabled device of the plurality of assistant-enabled devices, and determining the proximity information for the at least one assistant-enabled device based on a signal strength of the wireless communication signal received at the sensor of the user device. In some implementations, the method further includes obtaining, by the data processing hardware, directionality information for at least one assistant-enabled device of the plurality of assistant-enabled devices within the environment of the user device by receiving, at each sensor in an array of sensors of the user device, a wireless communication signal transmitted from the at least one assistant-enabled device of the plurality of assistant-enabled devices, and determining the directionality information for the at least one assistant-enabled device based on a respective signal strength of the wireless communication signal received at each sensor in the array of sensors of the user device relative to the respective signal strengths of the wireless communication signal received at the other sensors in the array of sensors of the user device. Here, determining the proximity score for the at least one assistant-enabled device is further based on the directionality information for the at least one assistant-enabled device.

In some examples, receiving the proximity information for at least one assistant-enabled device of the plurality of assistant-enabled devices within the environment of the user device includes receiving, at the user device, an audible or inaudible signal output from the at least one assistant-enabled device of the plurality of assistant-enabled devices, and determining the proximity information for the at least one assistant-enabled device based on an energy and/or frequency of the audible or inaudible signal output from the at least one assistant-enabled device. In some implementations, the method also includes receiving, at the data processing hardware, from each assistant-enabled device of the plurality of assistant-enabled devices, the respective set of available actions associated with the corresponding assistant-enabled device, and for each corresponding assistant-enabled device in the ranked list of candidate assistant-enabled devices, determining, by the data processing hardware, the respective set of controls for performing the respective set of actions associated with the corresponding assistant-enabled device. In these implementations, at least one available action in the respective set of available actions received from at least one assistant-enabled device of the plurality of assistant-enabled devices may include a suggested action for the corresponding assistant-enabled device to perform based on a current context. In additional examples, the method may include receiving, at the data processing hardware, from at least one assistant-enabled device of the plurality of assistant-enabled devices, device state information associated with the corresponding assistant-enabled device. Here, determining the respective set of controls for performing the respective set of actions associated with the corresponding assistant-enabled device is further based on the device state information associated with the corresponding assistant-enabled device.

In some implementations, generating the ranked list of candidate assistant-enabled devices from the plurality of assistant-enabled devices includes ordering the assistant-enabled devices from the assistant-enabled device having the closest proximity relative to the user device to the assistant-enabled device having the furthest proximity relative to the user device. In some examples, generating the ranked list of candidate assistant-enabled devices from the plurality of assistant-enabled devices includes discarding any assistant-enabled devices from the ranked list of candidate assistant-enabled devices that include proximity scores indicating proximity estimations that satisfy a maximum distance threshold. Generating the ranked list of candidate assistant-enabled devices from the plurality of assistant-enabled devices may additionally or alternatively include discarding any assistant-enabled devices from the ranked list of candidate assistant-enabled devices that include proximity scores indicating proximity estimations that satisfy a minimum distance threshold.

In some examples, the method further includes receiving, at the data processing hardware, from at least one assistant-enabled device of the plurality of assistant-enabled devices, device state information associated with the at least one assistant-enabled device, and after generating the ranked list of candidate assistant-enabled devices, re-ranking, by the data processing hardware, using the device state information associated with the at least one assistant-enabled device, the candidate assistant-enabled devices in the ranked list of candidate assistant-enabled devices. Here, displaying the respective set of controls for performing the respective set of actions associated with the corresponding assistant-enabled device is based on the re-ranking of the candidate assistant-enabled devices in the ranked list of candidate assistant-enabled devices.

The ranked list of candidate assistant-enabled devices from the plurality of assistant-enabled devices may include the assistant-enabled devices selected from the plurality of assistant-enabled devices having the N-highest proximity scores among the plurality of proximity scores determined for the plurality of assistant-enabled devices. In some examples, displaying the respective set of controls for performing the respective set of actions associated with the corresponding assistant-enabled device includes displaying the respective set of controls in the GUI for one of the assistant-enabled device in the ranked list of candidate assistant-enabled devices differently than the respective set of controls displayed in the GUI for at least another one of the assistant-enabled device in the ranked list of candidate assistant-enabled devices.

Another aspect of the disclosure provides a user device for controlling assistant-enabled devices located within an environment of the user device. The user device includes data processing hardware and memory hardware in communication with the data processing hardware. The memory hardware stores instructions that when executed by the data processing hardware cause the data processing hardware to perform operations that include obtaining proximity information for each of a plurality of assistant-enabled devices within the environment of the user device. Each assistant-enabled device of the plurality of assistant-enabled devices is controllable by an assistant application to perform a respective set of available actions associated with the assistant-enabled device. The operations also include, for each assistant-enabled device of the plurality of assistant-enabled devices, determining a proximity score based on the proximity information obtained for the corresponding assistant-enabled device. Here, the proximity score indicates a proximity estimation of the corresponding assistant-enabled device relative to the user device in the environment. The operations further include generating, using the plurality of proximity scores determined for the plurality of assistant-enabled devices, a ranked list of candidate assistant-enabled devices from the plurality of assistant-enabled devices, and for each of one or more corresponding assistant-enabled devices in the ranked list of candidate assistant-enabled devices, displaying, in a graphical user interface (GUI) displayed on a screen in communication with the data processing hardware, a respective set of controls for performing the respective set of actions associated with the corresponding assistant-enabled device.

Implementations of the disclosure may include one or more of the following optional features. In some implementations, the operations further include receiving a user request from a user of the user device requesting to launch the assistant application. In these implementations, obtaining the proximity information for each of the plurality of assistant-enabled devices occurs during execution of the assistant application. In additional implementations, receiving the user request includes one of: receiving, in the GUI displayed on the screen, a user input indication indicating selection of a graphical element representing the assistant application; receiving a speech input from the user that includes an invocation command to launch the assistant application for execution on the data processing hardware; or detecting a predefined movement/pose of the user device configured to launch the assistant application for execution on the data processing hardware.

In some examples, obtaining the proximity information for at least one assistant-enabled device of the plurality of assistant-enabled devices within the environment of the user device includes receiving, at a sensor of the user device, a wireless communication signal transmitted from the at least one assistant-enabled device of the plurality of assistant-enabled devices, and determining the proximity information for the at least one assistant-enabled device based on a signal strength of the wireless communication signal received at the sensor of the user device. In some implementations, the operations further include obtaining directionality information for at least one assistant-enabled device of the plurality of assistant-enabled devices within the environment of the user device by receiving, at each sensor in an array of sensors of the user device, a wireless communication signal transmitted from the at least one assistant-enabled device of the plurality of assistant-enabled devices, and determining the directionality information for the at least one assistant-enabled device based on a respective signal strength of the wireless communication signal received at each sensor in the array of sensors of the user device relative to the respective signal strengths of the wireless communication signal received at the other sensors in the array of sensors of the user device. Here, determining the proximity score for the at least one assistant-enabled device is further based on the directionality information for the at least one assistant-enabled device.

In some examples, receiving the proximity information for at least one assistant-enabled device of the plurality of assistant-enabled devices within the environment of the user device includes receiving an audible or inaudible signal output from the at least one assistant-enabled device of the plurality of assistant-enabled devices, and determining the proximity information for the at least one assistant-enabled device based on an energy and/or frequency of the audible or inaudible signal output from the at least one assistant-enabled device. In some implementations, the operations also include receiving, from each assistant-enabled device of the plurality of assistant-enabled devices, the respective set of available actions associated with the corresponding assistant-enabled device, and for each corresponding assistant-enabled device in the ranked list of candidate assistant-enabled devices, determining the respective set of controls for performing the respective set of actions associated with the corresponding assistant-enabled device. In these implementations, at least one available action in the respective set of available actions received from at least one assistant-enabled device of the plurality of assistant-enabled devices may include a suggested action for the corresponding assistant-enabled device to perform based on a current context. In additional examples, the operations may include receiving from at least one assistant-enabled device of the plurality of assistant-enabled devices, device state information associated with the corresponding assistant-enabled device. Here, determining the respective set of controls for performing the respective set of actions associated with the corresponding assistant-enabled device is further based on the device state information associated with the corresponding assistant-enabled device.

In some implementations, generating the ranked list of candidate assistant-enabled devices from the plurality of assistant-enabled devices includes ordering the assistant-enabled devices from the assistant-enabled device having the closest proximity relative to the user device to the assistant-enabled device having the furthest proximity relative to the user device. In some examples, generating the ranked list of candidate assistant-enabled devices from the plurality of assistant-enabled devices includes discarding any assistant-enabled devices from the ranked list of candidate assistant-enabled devices that include proximity scores indicating proximity estimations that satisfy a maximum distance threshold. Generating the ranked list of candidate assistant-enabled devices from the plurality of assistant-enabled devices may additionally or alternatively include discarding any assistant-enabled devices from the ranked list of candidate assistant-enabled devices that include proximity scores indicating proximity estimations that satisfy a minimum distance threshold.

In some examples, the operations further include receiving, from at least one assistant-enabled device of the plurality of assistant-enabled devices, device state information associated with the at least one assistant-enabled device, and after generating the ranked list of candidate assistant-enabled devices, re-ranking, using the device state information associated with the at least one assistant-enabled device, the candidate assistant-enabled devices in the ranked list of candidate assistant-enabled devices. Here, displaying the respective set of controls for performing the respective set of actions associated with the corresponding assistant-enabled device is based on the re-ranking of the candidate assistant-enabled devices in the ranked list of candidate assistant-enabled devices.

The ranked list of candidate assistant-enabled devices from the plurality of assistant-enabled devices may include the assistant-enabled devices selected from the plurality of assistant-enabled devices having the N-highest proximity scores among the plurality of proximity scores determined for the plurality of assistant-enabled devices. In some examples, displaying the respective set of controls for performing the respective set of actions associated with the corresponding assistant-enabled device includes displaying the respective set of controls in the GUI for one of the assistant-enabled device in the ranked list of candidate assistant-enabled devices differently than the respective set of controls displayed in the GUI for at least another one of the assistant-enabled device in the ranked list of candidate assistant-enabled devices.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2 is a schematic view of an example user device in communication with an assistant-enabled device.

FIG. 5 is a flowchart of an example arrangement of operations for a method for controlling assistant-enabled devices.

Like reference symbols in the various drawings indicate like elements.

DETAILED DESCRIPTION

Figure 1:
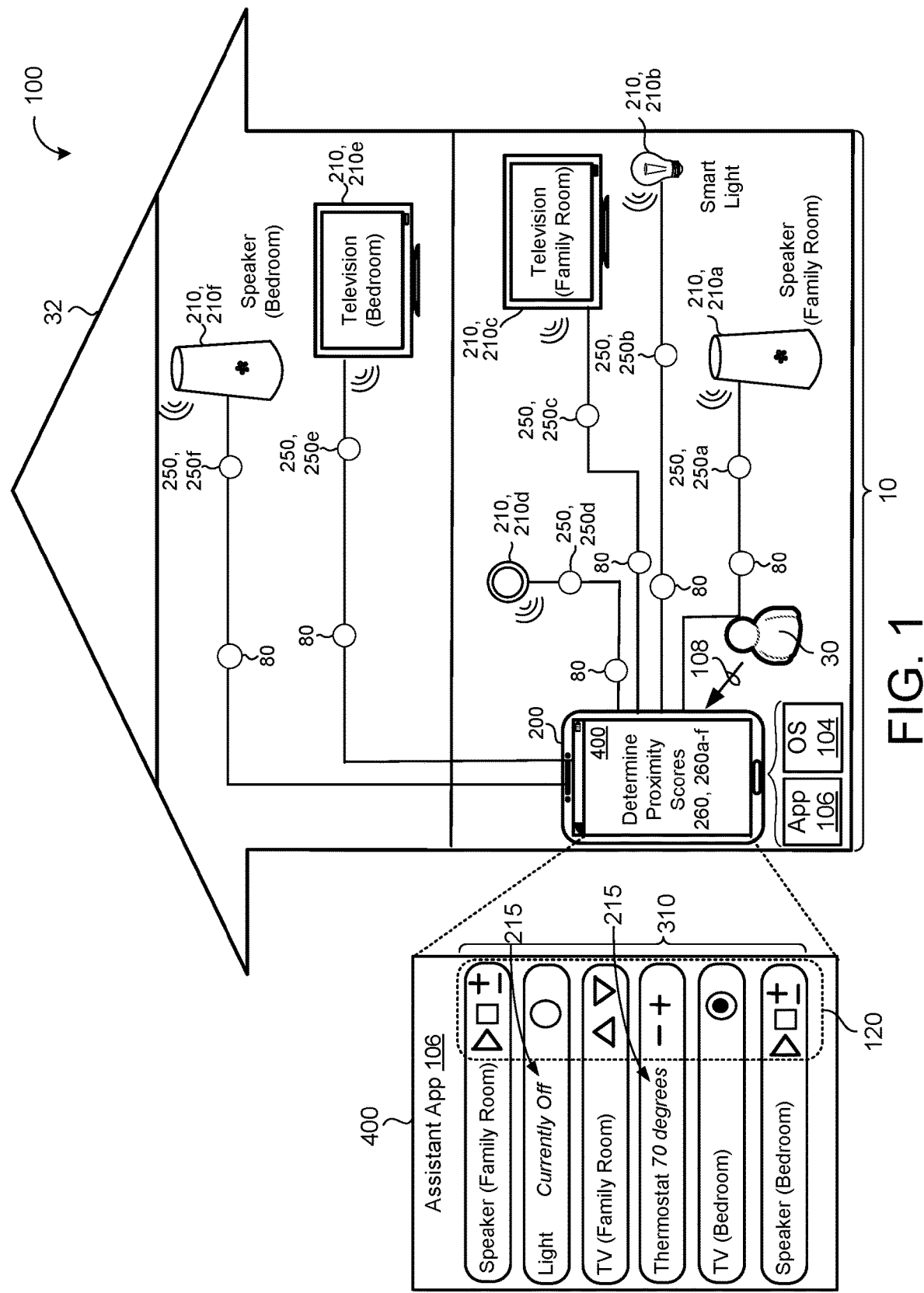
FIG. 1 is a schematic view of an example system including controlling assistant-enabled devices located within an environment of the user device.

The present disclosure is generally directed toward a user device executing an assistant application for controlling one or more assistant-enabled devices via an interface of a portable client device. Specifically, the user device can automatically detect, amongst a plurality of assistant-enabled devices within an environment of the user device, which assistant-enabled device a user of the user device most likely wishes to control from his or her user device. An assistant-enabled device can include any Internet of Things (IoT) device such as, for example, a smart light, a smart television, a smart speaker, a smart thermostat, a smart security system, or any smart appliance (e.g., a smart oven) that is configured to perform a respective set of actions. That is, a user device (e.g., smart phone, tablet, smart watch, smart display, etc.) executing the assistant application may provide a respective set of controls for controlling the assistant-enabled device to perform one or more of the respective set of actions. For instance, the user device may display in a graphical user interface the respective set of controls for any available actions the assistant-enabled device is capable of performing at a given instance, whereby the graphical user interface can receive a user input indication (e.g., touch input and/or speech input) indicating selection of one of the controls to cause the assistant-enabled device to perform the respective action. As users interact with an increasing amount of assistant-enabled devices in their environment (e.g., a home or office), managing multiple controls for controlling each of the devices from a single user device can become disorganized and cumbersome. Additionally, assistant-enabled devices may share overlapping capabilities, as well as similar device names, creating a need to disambiguate the respective controls between the devices.

Implementations herein are directed toward automatically detecting, amongst a plurality of assistant-enabled devices, which one(s) a user most likely wants to control via an interface displayed on a screen of a user device associated with the user. This detection is based on a proximity of each assistant-enabled device relative to the user device. For instance, each assistant-enabled device within an environment of the user device may broadcast proximity information receivable by the user device that the user device may use to determine the proximity of each assistant-enabled device relative to the user device. The proximity information may include wireless communication signals, such as WiFi, Bluetooth, or Ultrasonic, in which the signal strength of the wireless communication signals received at the user device may correlate proximities (e.g. distances) of the assistant-enabled devices relative to the user device. Proximity information could also include a user input indication indicating that user interacted with one of the assistant-enabled devices, e.g., by touching a device to adjust volume. By utilizing proximity-based detection, the user may reach his or her intended controls in fewer steps and less time. The user device can obtain proximity information for each of the assistant-enabled devices in the environment of the user that may be controlled by the user device. That is, based on the proximity information obtained from each of these assistant-enabled devices, the user device can determine a respective proximity score for each assistant-enabled device indicating a proximity estimation of the respective assistant-enabled device relative to the user device. Additionally, the user device may collect directionality information from one or more of the assistant-enabled devices to indicate a direction/orientation of the user device relative to each of the one or more assistant-enabled devices. That is, the directionality information may indicate whether or not the user device is facing, or pointed toward, a given assistant-enabled device to serve as an indicator that the user intends to use the user device to control the assistant-enabled device to perform a respective set of available actions. In these scenarios, the directionality information may be used in combination for determining the respective proximity score, or the directionality information may be used to bias a proximity score determined solely from the proximity information. After obtaining proximity information and/or directionality information, the user device can determine proximity scores for each of the assistant-enabled devices in the environment. After determining the proximity scores for each of the assistant-enabled devices in the environment, the user device (e.g., via execution of the assistant application) ranks the assistant-enabled devices based on the proximity scores to prioritize which assistant-enabled devices the user most likely intends to control at a given instant. Thereafter, the user device displays a respective set of controls for one or more of the assistant-enabled devices in the graphical user interface (GUI) displayed on the screen of the user device for use in controlling the one or more of the assistant-enabled devices to perform respective actions that are currently available. For example, the controls of the assistant-enabled device with the highest ranking proximity score may be displayed at the top of the screen in a larger font than the other controls associated with other assistant-enabled devices with lower ranking proximity scores in the user's environment. Additionally, assistant-enabled devices with very low ranking proximity scores may be omitted from being displayed in the GUI altogether since it is unlikely that the user intends to control such devices at a given instance time.

Referring to FIG. 1, in some implementations, a proximity-based controller system 100 includes a user device 200 in communication with a plurality of assistant-enabled devices 210, 210*a*—n within an environment 32 of the user device 200 via a network 10. The environment 32 may include a premises of a user 30 associated with the user device 200. In some examples, the environment 32 includes a portion of a premises of a user 30, such as a floor or other section of the premises. The network 10 may include a local area network (LAN) (e.g., a home area network HAN) that facilitates communication and interoperability among the user device 200 within an environment 32, such as a user's home, school, or office. In the example shown, the assistant-enabled devices 210 are located throughout the home 32 of the user 30 having a first floor and a second floor, in which a smart speaker 210*a*, a smart light 210*b*, a smart television 210*c*, and a smart thermostat 210*d* are located on the first floor, and a second smart television 210*e* and a second smart speaker 210*f* are located on the second floor, e.g., in the bedroom of the home 32 of the user 30. The user device 200 may communicate with each of the assistant-enabled devices 210 via wireless connections that use standard communications technologies and/or protocols. Thus, the network 10 can include Wireless Fidelity (WiFi) (e.g., 802.11), worldwide interoperability for microwave access (WiMAX), 3G, 4G, Long Term Evolution (LTE), 5G, digital subscriber line (DSL), Bluetooth, Near Field Communication (NFC), or any other wireless standards. The premises 32 may include one or more access points (AP) (not shown) configured to facilitate wireless communication between the user device 200 and one or more of the assistant-enabled devices 210, 210*a-f*.

The user device 200 can be any computing device that is capable of wireless communication with the assistant-enabled devices 210. While the user device 200 includes a tablet in the example shown, the user device 200 may also include, without limitation, a smart phone, a smart watch, a laptop, a desktop, or a smart display. The user device 200 may use a variety of different operating systems 104. In examples where the user device 200 is a mobile device, the user device 200 may run an operating system including, but not limited to, ANDROID® developed by Google Inc., IOS® developed by Apple Inc., or WINDOWS PHONE® developed by Microsoft Corporation. Accordingly, the operating system 104 running on the user device 200 may include, but is not limited to, one of ANDROID®, IOS®, or WINDOWS PHONE®. In some examples the user device 200 may run an operating system including, but not limited to, MICROSOFT WINDOWS® by Microsoft Corporation, MAC OS® by Apple, Inc., or Linux. The user device 200 may communicate with the assistant-enabled devices 210, 210a—f while running operating systems 104 other than those operating systems 104 described above, whether presently available or developed in the future. The operating system 104 may execute one or more software applications 106.

A software application 106 may refer to computer software that, when executed by a computing device, causes the computing device to perform a task. In some examples, the software application 106 is referred to as an "application", an "app", or a "program". Example software applications 106 include, but are not limited to, word processing applications, spreadsheet applications, messaging applications, media streaming applications, social networking applications, and games. Applications 106 can be executed on a variety of different user devices 200. In some examples, applications 106 are installed on the user device 200 prior to the user 30 purchasing the user device 200. In other examples, the user 30 downloads and installs application 106 on the user device 200.

In some implementations, the user device 200 executes an assistant application 106 that initiates communication with each assistant-enabled device 210 and provides a respective set of controls 220 for performing a respective set of actions 120 associated with each assistant-enabled device 210. That is, each assistant-enabled device 210 of the plurality of assistant-enabled devices 210 is controllable by the assistant application 106 to perform a respective set of available actions 120 associated with the assistant-enabled device 210. Advantageously, the assistant application 106 allows the user 30 to control and/or configure each assistant-enabled device 210 using an interface 400, such as a graphical user interface (GUI) 400 that the application 106 may render for display on a screen of the user device 200. In this way, the user 30 does not necessarily have to rely on a variety of individual applications to control various devices in their home, but, rather, can execute the assistant application 106 to indicate to the user device 200 which assistant-enabled device 210 that the user 30 would like to control. By having a single application 106 that provides a respective set of controls 220 for performing a respective set of available actions 120 associated with each of a plurality of assistant-enabled devices 210, memory and processing bandwidth is freed up at the user device 200 as a result of not necessarily requiring the user 30 to install, open, or switch between every application provided by manufacturers of the various assistant-enabled devices 210 in order to control the devices 210 to perform their respective set of actions 120. As used herein, the GUI 400 may receive user input indications via any one or of touch, speech, gesture, gaze, and/or an input device (e.g., mouse or stylist) for launching the application 106 as well as controlling functionality of the application 106 executing on the user device 200.

The assistant application 106 executing on the user device 200 may render for display on the GUI 400 a ranked list 310 of candidate assistant-enabled devices 210 that the user 30 may control via the user device 200. The ranked list 310 rendered on the GUI 400 may include, for each candidate assistant-enabled device 210, a respective graphic 402 identifying the candidate assistant-enabled device 210 and the respective set of controls 220 for performing the respective set of actions 120 associated with the corresponding assistant-enabled device 210. For example, the smart speakers 210a, 210f may each include the same respective set of actions 120 associated therewith that includes a Play operation for audibly playing media content (e.g., music), a Stop/Pause operation for stopping/pausing the audible output of the media content, and volume actions for increasing/decreasing volume of the audio content output from the corresponding speaker 210a, 210f. In this example, the assistant application 106 may display, for each of the smart speakers 210a, 210f displayed in the list 310, the same respective set of controls 220 for performing the respective set of actions 120 associated with the corresponding speaker 210a, 210f. That is, the respective set of controls 220 may include a control 220 for performing the action 120 associated with the Play operation, a control 220 for performing the action 120 associated with the Stop/Pause operation, a control 220 for performing the action 120 associated with increasing the volume level, and a control 220 or performing the action 120 associated with decreasing the volume level.

In some examples, the ranked list 310 of candidate assistant-enabled devices 210 rendered for display in the GUI 400 further includes a graphic indicating respective device state information 215 for at least one of the assistant-enabled devices 210 in the ranked list 310. In the example shown, the device state information 215 for the smart light 210b is displayed to indicate that the smart light 210b is currently off, and thus, not providing illumination. Likewise, the device state information 215 for the smart thermostat 210d is displayed to indicate a current temperature setting of the smart thermostat 210d (e.g., the temperature is currently 70-degrees Fahrenheit.)

The respective set of available actions 120 associated with each assistant-enabled device 210 may change depending on the device state information 215 of the assistant-enabled device 210. For example, when the smart light 210b indicates the device state information 215 of currently off, and thus not providing illumination, the only action 120 available for the smart light 210b to perform would be to turn on, thereby causing the assistant application 106 to only provide a corresponding control 220 for causing the smart light 210b to perform the operation of switching from the off state to the on state in which the smart light 210b will provide illumination. On the other hand, when the device state information 215 of the smart light 210b is currently on, and thus providing illumination, the smart light 210b may perform at least the action 120 of turning off and optionally perform operations to increase/decrease illumination settings in which the illumination provided by the smart light 210b can be increased or decreased. In this scenario, the assistant application 106 may provide a set of controls 220 that each allow the user 30 to control the smart light 210b to perform a respective one of the actions 120 of switching from the on state to the off state, increasing the illumination setting, or decreasing the illumination setting. Thus, at least one available action 120 in the respective set of available actions 120 received from at least one assistant-enabled device 210 may include a suggested action for the corresponding assistant-enabled device 210 to perform based on a current context. Here, the current context may include the device state information 215 of the corresponding assistant-enabled device 210. The current context may additionally or alternatively include past behavior of the user 30 indicating which assistant-enabled device 210 the user 30 actually controlled under the same or similar contexts that include, without limitation, same or similar proximity information 250, directionality information 255, and/or device state information 215 associated with one or more of the assistant-enabled devices 210 in the environment 32 of the user 30.

The assistant application 106 may further provide settings to allow the user 30 of the user device 200 to customize active controls 220 for performing one or more specific actions 120 associated with each assistant-enabled device 210. The user 30 may provide a user request 108 requesting to launch the assistant application 106 for execution on the user device 200. For example, a graphical user interface (GUI) 400 displayed on a screen of the user device 200 may receive the user request 108 as a user input indication indicating selection of a graphical element representing the assistant application 106 or the user 30 may provide the user request 108 via a speech input that includes an invocation command to launch the assistant application 106 for execution on the user device 200. In other examples, the user device 200 receives the user request 108 responsive to detecting a predefined movement/pose of the user device 200 that is configured to launch the assistant application 106 for execution on the user device 200. For example, the user device 200 may include an accelerometer that detects the user 30 moving the user device from a first position to a second position.

Presenting each respective set of controls 220 in the GUI 400 can become unmanageable as the number of assistant-enabled devices 210 in the environment 32 increases. For example, simply displaying the respective set of controls 220 for performing the respective set of actions 120 associated with each of the plurality of assistant-enabled devices 210 would require the user 30 to navigate the GUI 400 to locate the target assistant-enabled device 210 the user 30 would like to control. For obvious reasons, when there are a multitude of assistant-enabled devices 210 available to control, this is a tedious and burdensome undertaking for the user 30. By using proximity information 250 for each of the plurality of assistant-enabled devices 210 within the environment 32 of the user 30, implementations herein are directed toward the assistant application 106 automatically detecting one or more candidate assistant-enabled devices 210 amongst the plurality of assistant-enabled devices 210 within the environment 32 as a target assistant-enabled device 210 the user 30 wants to control by commanding/instructing the target assistant-enabled device 210 to perform a respective action 120. For example, the user 30 may provide a user input indication indicating selection of one of the controls 220 displayed in the GUI 400 that is associated with performing a respective action 120 associated with the target assistant-enabled device 210, thereby causing the assistant application 106 to transmit a corresponding command 80 to the target assistant-enabled device 210 to perform the respective action 120.

In the example shown, during execution of the assistant application 106, the user device 200 receives proximity information 250, 250a—f for each of the plurality of assistant-enabled devices 210, 210a—f within the environment 32. For each assistant-enabled device 210, the user device 200 determines (i.e., using the assistant application 106) a proximity score 260, 260a—f based on the proximity information 250 obtained for the corresponding assistant-enabled device 210. Here, each proximity score 260 indicates a proximity estimation of the corresponding assistant-enabled device 210 relative to the user device 200 within the environment 32. As used herein, the proximity estimation may include a distance the corresponding device 210 is located from the user device 200. The proximity estimation may further include a location of the corresponding device 210 relative to a location of the user device 200. Using the plurality of proximity scores 260 determined for the plurality of assistant-enabled devices 210, the user device 200 generates (i.e., using the assistant application 106) a ranked list 310 of candidate assistant-enabled devices 210 from the plurality of assistant-enabled devices 210 within the environment 32. Here, the ranked list 310 is displayed in the GUI 400, and for each assistant-enabled device 210 in the ranked list 310, the user device 200 displays, in the GUI 400, the respective set of controls 220 for performing the respective set of actions 120 associated with the corresponding assistant-enabled device 210.

In some implementations, the assistant application 106 generates the ranked list 310 of candidate assistant-enabled devices 210 by ordering the assistant-enabled devices 210 from the assistant-enabled device 210 having the closest proximity relative to the user device 200 to the assistant-enabled device 210 having the furthest proximity relative to the user device 200. For example, FIG. 1 shows the ranked list 310 of candidate assistant-enabled devices 210 displayed in the GUI 400 from top to bottom including the smart speaker 210a, the smart light 210b, the smart television 210c, the smart thermostat 210d, the second smart television 210e, and the second smart speaker 210f. Here, the smart speaker 210a, displayed at the top of the ranked list 310 in the GUI 400, includes the closest proximity relative to the user device 200 while the second smart speaker 210f, displayed at the bottom of the ranked list 310 in the GUI 400, includes the furthest proximity relative to the user device 200.

In some examples, the assistant application 106 generates the ranked list 310 of candidate assistant-enabled devices 210 by selecting the assistant-enabled devices 210 having the N-highest proximity scores 260 among the plurality of proximity scores 260 determined for the plurality of assistant-enabled devices 210 within the environment 32 of the user device 200. In additional examples, the ranked list 310 of candidate assistant-enabled devices 210 includes only assistant-enabled devices 210 having proximity scores 260 that satisfy a maximum distance threshold. Here, the maximum distance threshold may be configurable and be associated with a far distance between an assistant-enabled device 210 and the user device 200 to indicate that it is unlikely that the user 30 would intend to control that assistant-enabled device 210. In this way, an assistant-enabled device 210 separated from the user device 200 by more than the maximum distance threshold can be effectively filtered out of the ranked list 310 of candidate assistant-enabled devices 210. For example, when the user device 200 is on a first floor, one or more assistant-enabled devices 210 located on a second floor may be excluded from the ranked list 310 of candidate assistant-enabled devices 210. Additionally or alternatively, the ranked list 310 of candidate assistant-enabled devices 210 may exclude any assistant-enabled devices 210 having proximity scores 260 indicating proximity estimations that satisfy a minimum distance threshold. Here, the minimum distance threshold may be configurable and be associated with a short distance between an assistant-enabled device 210 and the user device 200 to indicate that the user 30 is close enough to manually control the assistant-enabled device 210 directly without using the application 106. In this way, an assistant-enabled device 210 within reaching distance of the user 30 can be effectively filtered out of the ranked list 310 of candidate assistant-enabled devices 210.

FIG. 2 shows an example user device 200 in communication with an assistant-enabled device (e.g., a smart speaker) 210. The user device 200 includes data processing hardware 202 and memory hardware 204 in communication with the data processing hardware 202 and storing instructions that when executed on the data processing hardware 202 cause the data processing hardware 202 to execute the assistant application 106. The user device 200 may also include at least one sensor 206, such as antenna, configured to receive wireless communication signals transmitted by the assistant-enabled devices 210. The user device 200 may also include an array of one or more microphones 208. The assistant-enabled device 210 may include one of a plurality of assistant-enabled devices 210 within an environment 32 of the user device 200 that is controllable by the assistant application 106 to perform a respective set of available actions 120 associated with the assistant-enabled device 210. In some examples, the assistant-enabled device 210 publishes the respective set of available actions 120 that the assistant-enabled device 210 can perform. In the example shown, the respective set of available actions 120 include media player actions 120 including a Play operation, Volume control operations, a Stop/Pause operation, and next/previous track operations. The user device 200 may receive the set of available actions 120 from the assistant-enabled device 210 directly, or indirectly via an access point (not shown). The user device 200 may then determine the respective set of controls 220 for display in the GUI 400 based on the respective set of available actions 120 received from the assistant-enabled device 210. The user 30 may provide a user input indication indicating selection of one of the controls 220 displayed in the GUI 400 that is associated with performing a respective action 120 associated with a target assistant-enabled device 210 (e.g., the speaker) the user 30 actually wants to control, thereby causing the assistant application 106 to transmit a corresponding command 80 to the target assistant-enabled device 210 to perform the respective action 120.

The user device 200 may also receive device state information 215 from the assistant-enabled device 210. For instance, the device state information 215 may indicate that the assistant-enabled device 210 is currently on and playing a music playlist. The user device 200 also receives proximity information 250 from the assistant-enabled device 210. The user device 200 may continuously, or at least during periodic intervals, receive the proximity information 250 and optionally the device state information 215 from each assistant-enabled device 210 within the environment 32 of the user device 200. As used herein, the proximity information 250 includes any information or data that the user device 200 may use to determine a proximity score 260 for the corresponding assistant-enabled device 210, whereby the proximity score 260 indicates a proximity estimation of the corresponding assistant-enabled device 210 relative to the user device 200 in the environment 32. Accordingly, while many examples include the user device 200 determining a proximity score 260 for a corresponding assistant-enabled device 210 based on proximity information 250 received from that assistant-enabled device 210, the user device 200 may receive the proximity information 250 associated with the corresponding assistant-enabled device 210 from another device. For example, another device including an image capture device may provide image data indicating the proximity information 250 associated with the assistant-enabled device 210 in relation to the user device 200.

In some examples, the user device 200 receives, at the sensor 206 of the user device 200, a wireless communication signal transmitted by the assistant-enabled device 210 and determines the proximity information 250 based on a signal strength of the wireless communication signal received at the sensor 206 of the user device 200. Here, the wireless communication signal may include, without limitation, a Bluetooth signal, an infrared signal, a NFC signal, or an ultrasonic signal. In other examples, the user device 200 receives the proximity information 250 from an access point (not shown) that indicates a signal strength of a wireless communication signal received at the access point from the assistant-enabled device 210. In these examples, the user device 200 may determine the proximity score 260 indicating the proximity estimation based on the signal strength of wireless communication signals received at the access point from the user device 200. In additional examples, the user device 200 receives, at the array of one or more microphones 208, an audible or inaudible signal output from the assistant-enabled device 210 and determines the proximity information 250 for the at least one assistant-enabled device 210 based on an energy and/or frequency of the audible or inaudible signal output from the assistant-enabled device 210.

In some implementations, the user device 200 additionally obtains directionality information 255 for the assistant-enabled device 210 by receiving at each microphone (e.g., sensor) in the array of microphones 208, a wireless communication signal transmitted by the assistant-enabled device 210 and determining the directionality information 255 based on a respective signal strength of the wireless communication signal received at each microphone (e.g., sensor) in the array of sensors 208 relative to the respective signal strengths of the wireless communication signals received at the other microphones in the array of microphones 208. In these implementations, the proximity score 260 determined for the assistant-enabled device 210 is further based on the directionality information 255. For example, the directionality information 255 may indicate that the user device 200 is not facing, or pointed toward, the assistant-enabled device 210. This may serve as a strong indicator that the user 30 does not intend to control the assistant-enabled device 210. As such, the directionality information 255 may bias the proximity score 260 by increasing the proximity score 260 when the directionality information 255 indicates the user device 200 is pointed toward the assistant-enabled device 210 or decreasing the proximity score 260 when the directionality information 255 indicates the user device 200 is pointed away from the assistant-enabled device 210. As used herein, proximity scores 260 increase as proximity relative to the user device 200 decreases and decrease as proximity relative to the user device 200 increases. Thus, the magnitude of the proximity score 260 is inversely proportional to the proximity of the corresponding assistant-enabled device 210 relative to the user device 200.

In some implementations, the assistant application 106 trains a user-specific control model on historical data including, without limitation, past proximity-directionality information 250, 255, resulting proximity scores 260, available sets of actions 120, device state information 215, and the target assistant-enabled device 210 associated with the control 220 the user 30 actually controlled to perform a respective action 120 associated therewith. For instance, the user 30 may provide a user input indication indicating selection of one of the controls 220 displayed in the GUI 400 that is associated with performing a respective action 120 associated with the target assistant-enabled device 210, thereby causing the assistant application 106 to transmit a corresponding command 80 to the target assistant-enabled device 210 to perform the respective action 120.

Figure 3A:
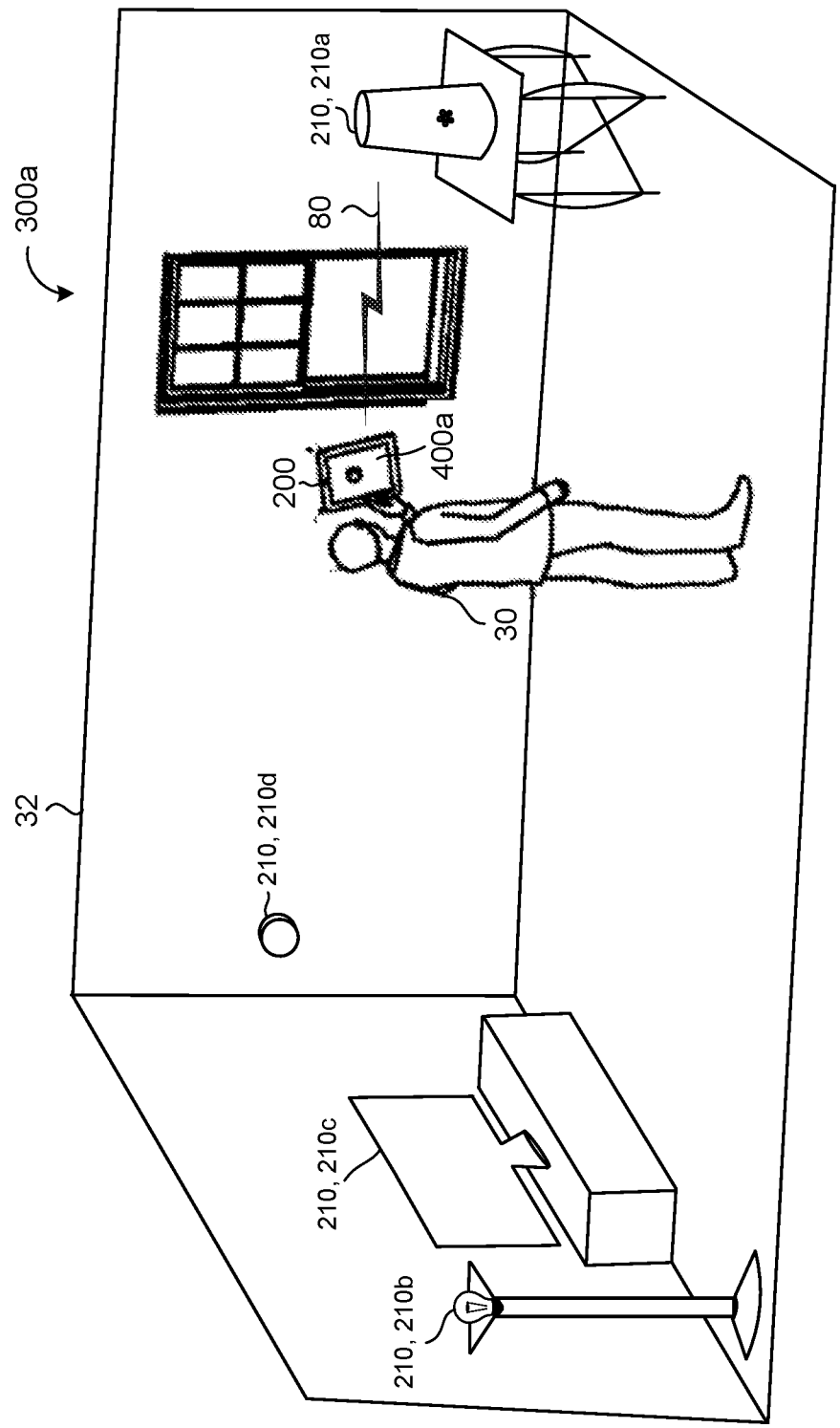
FIGS. 3A-3C are schematic views 300a-c of a user device controlling assistant-enabled devices within an environment of the user device.
Figure 3B:
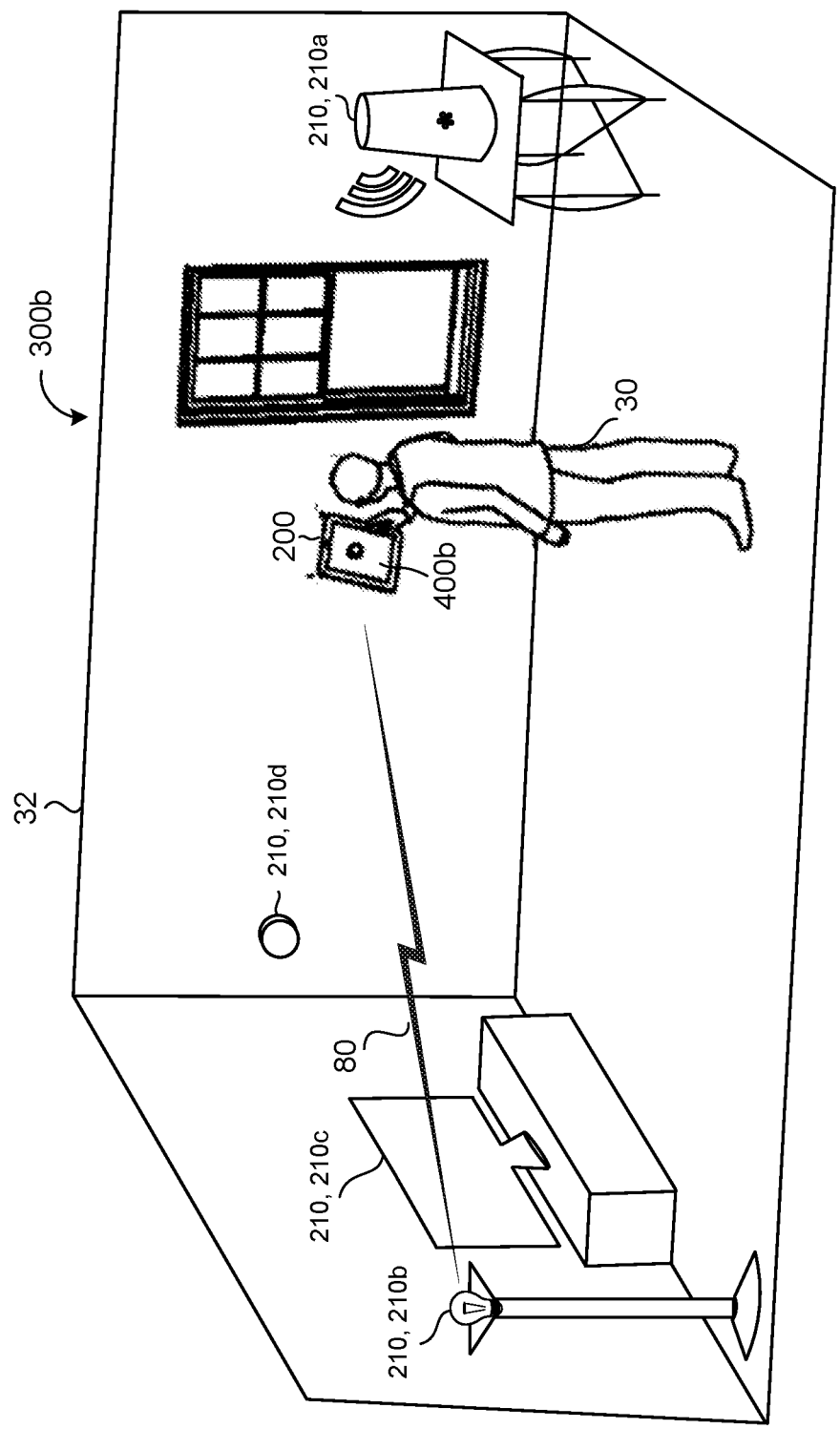
Figure 3C:
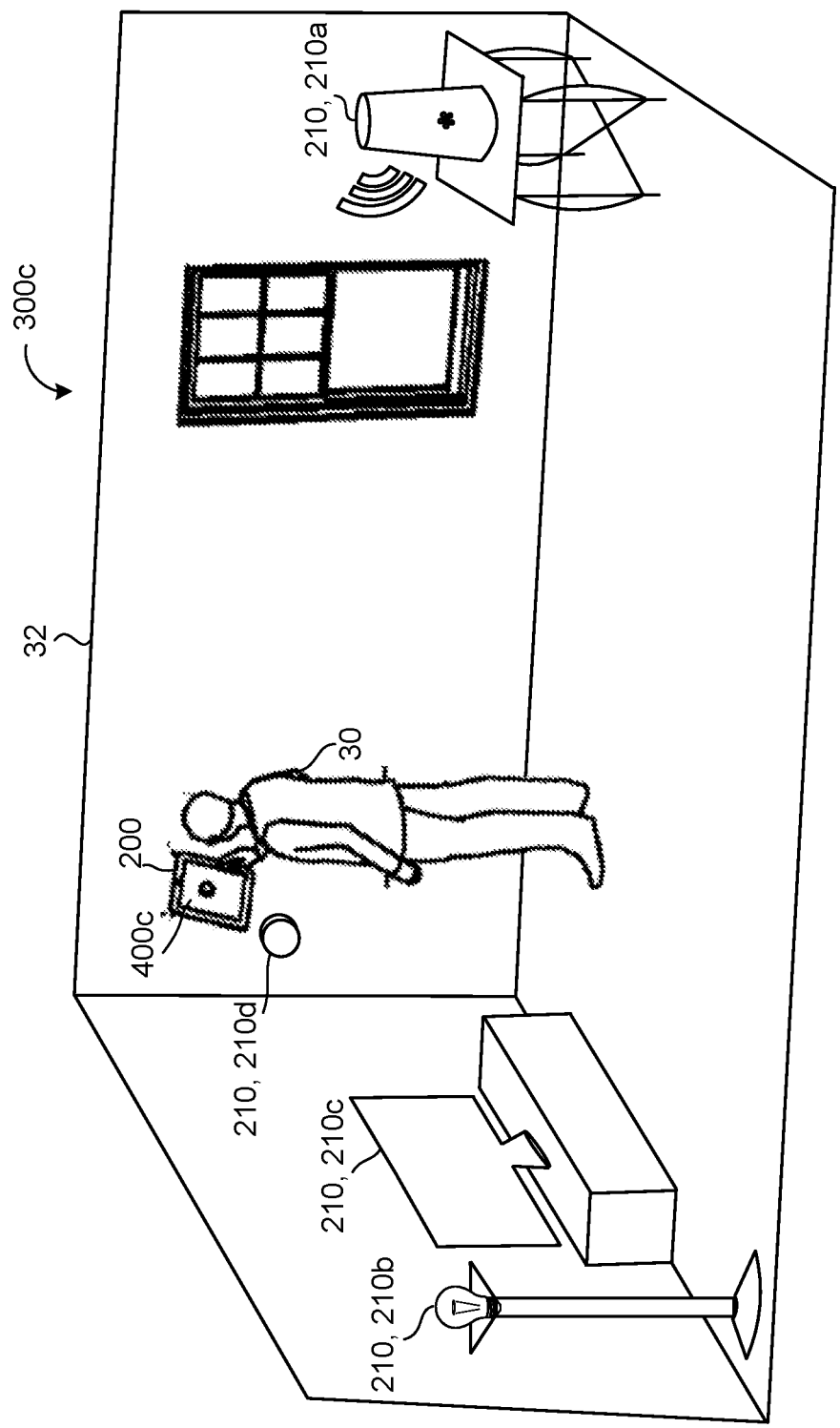
Figure 4A:
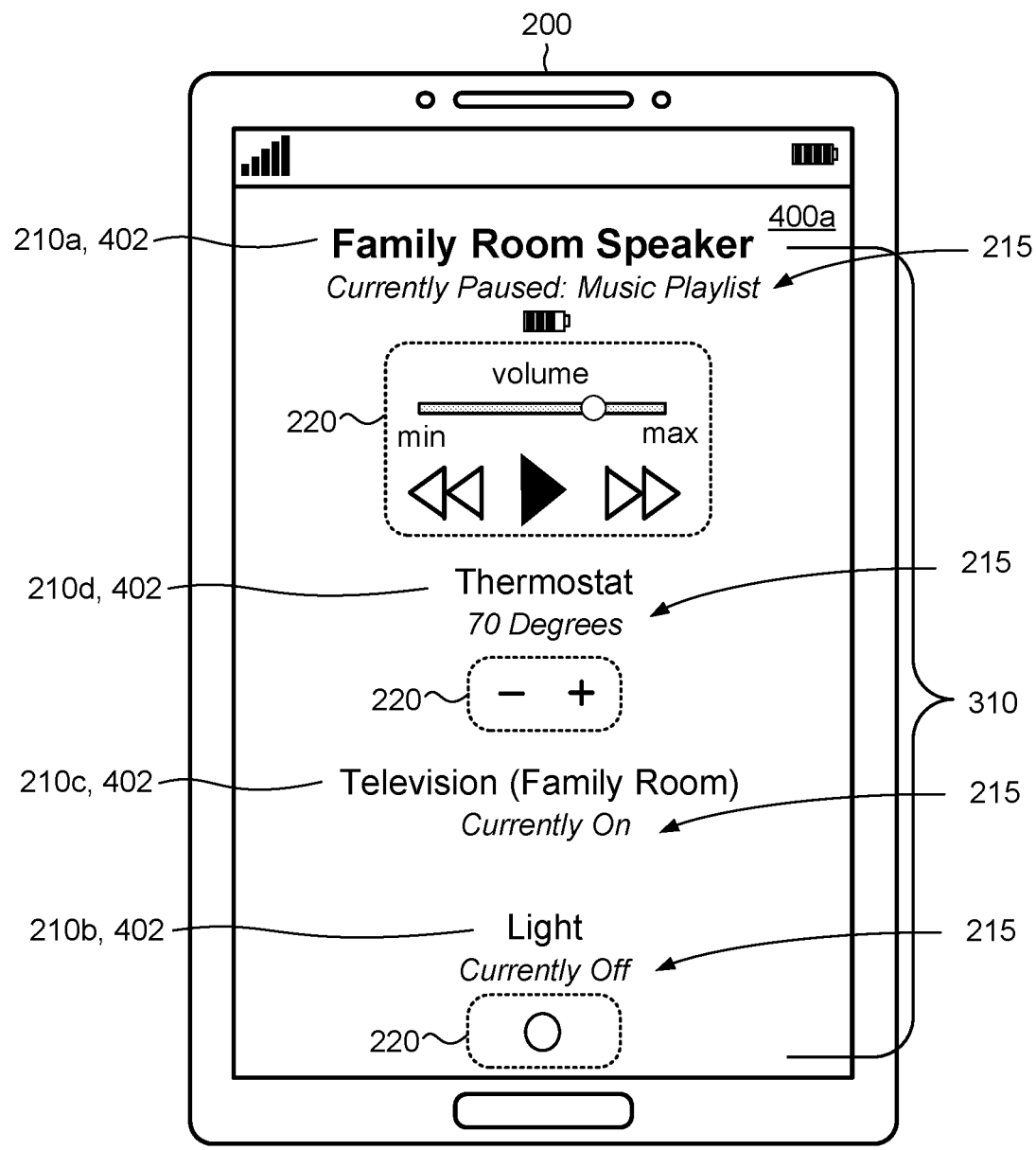
FIGS. 4A-4C are example GUIs 400a-c rendered on the screen of the user device to display a respective set of controls for performing a respective set of actions associated with each corresponding assistant-enabled device.
Figure 4B:
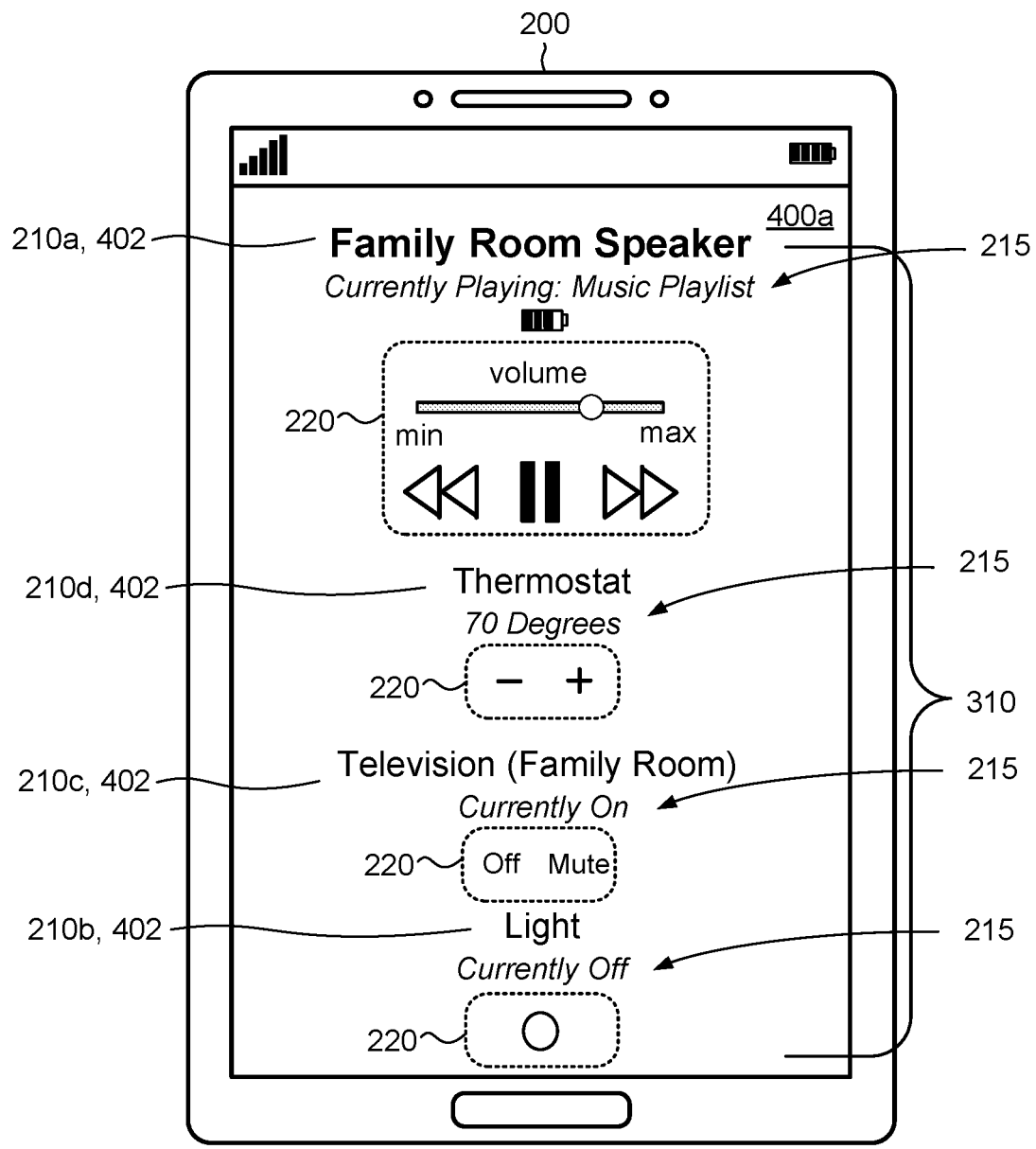
Figure 4C:
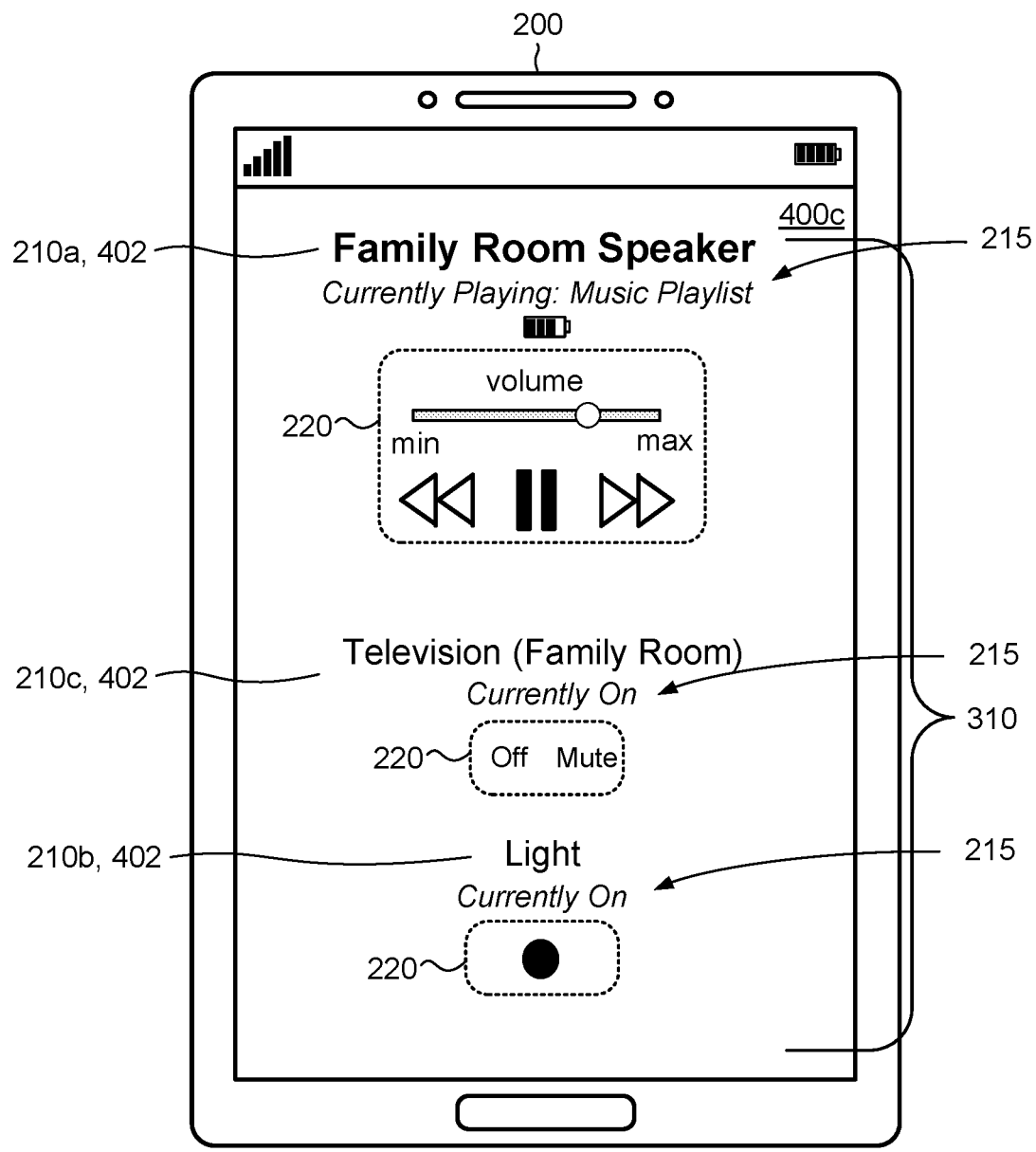

FIGS. 3A-3C show schematic views 300a—c of a user device 200 executing an assistant application 106 for controlling a plurality of assistant-enabled devices 210 within an environment (e.g., room 32) of the user device 200 as a user 30 moves through the room holding the user device 200. The room may include a family room on the first floor of the premises 32 of FIG. 1, in which the assistant-enabled devices 210, 210a—d are positioned throughout the family room. Specifically, the schematic views of 300a—c show the plurality of assistant-enabled devices 210 including the smart speaker 210a, the smart light 210b, the smart television 210c, and the smart thermostat 210d. FIGS. 4A-4C show example GUIs 400a—c rendered on the screen of the user device 200 to display a respective set of controls 220 for performing a respective set of actions 120 associated with each corresponding assistant-enabled device 210. Specifically, each GUI 400a—c depicts a ranked list 310 of candidate assistant-enabled devices 210 and the respective set of controls 220 for each device 210 based on proximity information 250 obtained for each of the plurality of assistant-enabled devices 210 of FIGS. 3A-3C. Each candidate assistant-enabled device 210 in the ranked list 310 may be rendered in the GUI 400 as a respective graphic 402 representing the candidate assistant-enabled device 210. That is, the GUI 400a of FIG. 4A shows the ranked list 310 of candidate assistant-enabled devices 210 and corresponding controls 220 generated based on the proximity estimations of the assistant-enabled devices 210 relative to the user device 200 in the environment 32 of FIG. 3A. The GUI 400b of FIG. 4B shows the ranked list 310 of candidate assistant-enabled devices 210 and corresponding controls 220 generated based on the proximity estimations of the assistant-enabled devices 210 relative to the user device 200 in the environment 32 of FIG. 3B. The GUI 400c of FIG. 4C shows the ranked list 310 of candidate assistant-enabled devices 210 and corresponding controls 220 generated based on the proximity estimations of the assistant-enabled devices 210 relative to the user device 200 in the environment 32 of FIG. 3C. As will become apparent, the ranked list 310 of candidate assistant-enabled devices 210 rendered in each of the respective GUIs 400a—c changes based on the proximity scores 260 determined for each of the assistant-enabled devices 210 as the user device 200 moves to each of the different locations in the room 32 as shown in the schematic views 300a-c of FIGS. 3A-3C.

Referring to FIGS. 3A and 4A, the user 30 is located on a far-end of the room near the smart speaker 210a positioned on a table while the other assistant-enabled devices 210, including the smart light 210b, the smart television 210c, and the smart thermostat 210d, are located on an opposite end of the room. Moreover, the user device 200 and the user 30 are pointed toward the smart speaker 210a indicating that the user 30 likely intends to control the smart speaker 210a via the assistant application 106. Additionally, the user device 200 and the user 30 are pointed away from the smart light 210b, the smart television 210c, and the smart thermostat 210d, indicating that the user 30 likely does not intend to control the smart light 210b, the smart television 210c, or the smart thermostat 210d via the assistant application 106.

As discussed above with reference to FIGS. 1 and 2, the user device 200 may continuously (or at periodic intervals) obtain proximity information 250 for each of the assistant-enabled devices 210 within the environment 32 to determine corresponding proximity scores 260, whereby each proximity score 260 indicates a proximity estimation of the corresponding assistant-enabled device 210 relative the user device 200 within the environment 32. As shown in FIG. 3A, the smart speaker 210a is in closest proximity to the user 30 holding the user device 200, resulting in a higher proximity score 260. As the candidate assistant-enabled device 210 with the highest proximity score 260, it is a strong indicator that the user 30 wishes to control the smart speaker 210a. Conversely, the smart light 210b, smart television 210c, and smart thermostat 210d are further away from the user 30 holding the user device 200, resulting in lower proximity scores 260. Accordingly, as a magnitude, a proximity score 260 may serve as a strong indicator as to whether the user 30 intends to, or does not intend to, control a corresponding candidate assistant-enabled device 210. The user device 200 (i.e., using the assistant application 106) may identify the smart speaker 210a as having the highest proximity score 260 among the plurality of assistant-enabled devices 210a—d as a target assistant-enabled device 210 the user 30 intends to control.

Additionally, assistant-enabled devices 210 located in other rooms on the second floor of the user's premises 32, such as the second smart television 210e and the second smart speaker 210f shown in FIG. 1, may have even lower proximity scores 260 that result in the user device 200 (i.e., using the assistant application 106) disqualifying those assistant-enabled devices 210 from consideration as possible candidates the user 30 intends to control. As a result, the user device 200 may discard the second smart television 210e and the second smart speaker 210f from the ranked list 310 of candidate assistant-enabled devices 210 rendered in the GUIs 400a—c of FIGS. 4A-4C.

With reference to FIGS. 3A and 4A, after determining the proximity scores 260 for each of the assistant-enabled devices 210, the user device 200 generates (i.e., using the assistant application 106) a ranked list 310 of candidate assistant-enabled devices 210 and corresponding controls 220 based on the proximity scores 260 indicating proximity estimations of the assistant-enabled devices 210 relative to the user device 200. More specifically, the user device 200 generates the ranked list 310 by ordering the assistant-enabled devices 210 from the assistant-enabled device 210a having the closest proximity relative to the user device 200 to the assistant-enabled device 210d having the furthest proximity relative to the user device 200. In additional examples, the proximity scores 260 are combined with additional contextual information such as confidence levels for the respective set of available actions associated with the corresponding assistant-enabled device 210. For instance, there may be a higher confidence for turning off a light later in the evening. In essence, such contextual information can be used to bias the proximity scores 260 to influence how the assistant-enabled devices are positioned in the ranked list 310 that is personalized for the user.

The GUI 400a of FIG. 4A displays the ranked list 310 of candidate assistant-enabled devices 210 that the user device 200 generates using the proximity scores 260 determined for each of the assistant-enabled devices 210. As noted above, the user device 200 may determine that the proximity scores 260 associated with the second smart television 210e and the second smart speaker 210f located on the second floor of the user's premises 32 of FIG. 1 may indicate proximity estimations that satisfy a maximum distance threshold, thereby resulting in the user device 200 discarding these assistant-enabled devices 210e, 210f from the ranked list 310 of candidate assistant-enabled devices 210. As a result of having the highest proximity score 260, the user device 200 ranks the smart speaker 210a higher in the ranked list 310, thereby resulting in the user device 200 rendering the corresponding graphical element 402 representing the smart speaker 210a, corresponding controls 220, and device state information 215 in the GUI 400a more prominently than the graphical elements 402 representing each of the lower ranking assistant-enabled devices 210b—d in the ranked list 310. In the example shown, the user device 200 renders/ displays, in the GUI 400a, the graphical elements 402 of the ranked list 310 of candidate assistant-enabled devices 210 and corresponding controls 220 with the smart speaker 210a at the top, in a larger font. The GUI 400a is non-limiting, and in other examples, the user device 200 may render the graphical element 402 representing the smart speaker 210a associated with the highest proximity score 260 in other locations of the GUI 400a such as the middle, and/or display the graphical element 402 differently than the graphical elements 402 representing the other assistant-enabled devices 210b-d. This display formatting makes it easier for the user 30 to quickly find the respective set of controls 220 for performing the respective set of actions 120 associated with the smart speaker 210a.

In the example GUI 400a shown in FIG. 4A, the respective set of controls 220 for the smart speaker 210a that are displayed in the GUI 400a include controls 220 for causing the smart speaker 210a to perform any actions 120 from a respective set of actions 120 associated with a music playlist (e.g., from a streaming music service) that are currently available for the smart speaker 210a to perform. This respective set of controls 220 include controls 220, that when selected, cause the smart speaker 210a to perform respective actions 120 of reverting to a previous song track in the playlist, playing the music playlist, skipping to a next song track in the playlist, and adjusting a volume level of the smart speaker 210a. Continuing with the example, the graphical element 402 representing the smart speaker 210a located in the family room of the user's premises 32 also displays the device state information 215 associated with the smart speaker 210a that indicates the battery level of the smart speaker 210a, and that the music playlist is currently paused, and thus, no music is currently being output from the smart speaker 210a. Notably, a control 220 for performing an action 120 of pausing the playlist is not displayed in the GUI 400a since the playlist is currently paused. Here, the user 30 may provide a user input indication indicating selection of the "Play" control 220 (e.g. by touching a graphical button in the GUI 400a that universally represents "Play") to cause the smart speaker 210a to perform the respective action 120 of audibly playing a current song track in the playlist. Optionally, the user input indication indicating selection of the "Play" control 220 may include a speech input, such as the user 30 uttering the term "Play," that may be captured by a microphone of the user device 200. Notably, speech recognition capabilities for controlling the devices 210 in the ranked list 310 may be biased based on the proximity scores 260. This follows the notion that a user may be more likely to issue voice-based commands. As such, a proximity score 260 satisfying a threshold for a particular device 210 may cause a microphone to open at the device 210 for capturing and performing speech recognition on the captured speech. Additionally or alternatively, speech recognition capabilities for a particular device 210 may be biased to recognize the respective set of available actions 120 for that device 210. As shown in FIG. 3A, the user input indication indicating selection of the "Play" control 220 displayed in the GUI 400a causes the user device 200 (i.e., the assistant application 106) to transmit a corresponding command 80 to the smart speaker 210a to perform the respective action 120 of audibly playing the current song track in the playlist.

Referring back to the GUI 400a of FIG. 4A, the user device 200 further displays, in the GUI 400a, graphical elements 402 representing the other assistant-enabled devices 210b—d in the ranked list 310 of candidate assistant-enabled devices 210. Specifically, the smart thermostat 210d is second in the ranked list 310 due to the smart thermostat 210d having the second highest proximity score 260, the smart television 210c is third in the ranked list 310 due to the smart television 210c having the third highest proximity score 260, and the smart light 210b is last in the ranked list 310 due to the smart light 210b having the lowest proximity score 260. In the example shown, the graphical element 402 representing the smart thermostat 210d provides device state information 215 indicating a current temperature setting (e.g., 70-degrees) of the smart thermostat 210d and a respective set of controls 220 for controlling the smart thermostat 210d to perform respective actions 120 of increasing or decreasing the current temperature setting. Similarly, the graphical element 402 representing the smart light 210b provides device state information 215 indicating the smart light 210b is currently off and a single control 220 for controlling the smart light 210b to perform the respective action 120 of turning on.

In some examples, for candidate assistant-enabled devices 210 in the ranked list 310 that are associated with lower ranking proximity scores 260, the GUI 400a may only display the device state information 215 associated with those assistant-enabled devices 210 without rendering the respective controls 220. If, however, the user 30 does want to control any of these devices 210 to perform respective actions 120, the user 30 may provide an input indication that selects the corresponding graphical element 402 to cause the GUI 400a to render the respective set of controls 220 thereon. In the example shown, the user device 200 (i.e., using the application 106) suppresses the display of respective controls 220 for the smart television 210c in the ranked list 310 due to the smart television 210c having a low proximity score 260 (e.g., failing to satisfy a minimum proximity score threshold). This decision to suppress the display of the controls 220 may be based on corresponding directionality information 255 indicating that the user device 200 is pointed away from the smart television 210c. Here, the directionality information 255 may bias the proximity score 260 for the smart television 210c by reducing it. Moreover, the user device 200 may consider context, such as a type of assistant-enabled device 210, when considering whether or not to bias a proximity score 260 based on directionality information 255. In the current example, context indicating that the assistant-enabled device 210c is a smart television and that users typically orient themselves to face smart televisions when issuing commands, the directionality information 255 indicating that the user device 200 is pointed away from the smart television 210c can serve as a strong indicator that the user 30 has no intent to control the smart television 210c. As a result, the user device 200 may optionally suppress the display of controls 220 in the GUI 400a for causing the smart television 210c to perform any actions 120, even if there are actions 120 available for the smart television 210c to perform. On the other hand, directionally information 255 associated with the smart light 210b may not be used for biasing the proximity score 260 since users 30 typically do not orient themselves in any particular manner when controlling operation of smart lights. Conversely, the directionality information 255 indicating that the user device 200 is facing the smart speaker 210a may further bias the proximity score 260 for the smart speaker 210a by increasing the proximity score 260. However, the amount of biasing may be weighted less since users often control smart speakers to perform operations even when facing other directions.

Referring to FIGS. 3B and 4B, the smart speaker 210a is audibly playing the current song track in the music playlist in response to the user 30 providing a user input indication indicating selection of the "Play" control 220 displayed in the GUI 400a of FIG. 4A to cause the user device 200 to transmit the command 80 to the smart speaker 210a to perform the respective "Play" action 120 as shown in FIG. 3A. Additionally, the user device 200 and the user 30 are pointed toward the other assistant-enabled devices 210, including the smart light 210b, the smart television 210c, and the smart thermostat 210d, thereby indicating that the user 30 may likely intend to control one of the smart light 210b, smart television 210c, or smart thermostat 210d via the assistant application 106.

As shown in FIG. 3B, the smart speaker 210a remains in closest proximity to the user 30 holding the user device 200, resulting in a higher proximity score 260. As the candidate assistant-enabled device 210 with the highest proximity score 260, it is a strong indicator that the user 30 wishes to control the smart speaker 210a. Conversely, the smart light 210b, smart television 210c, and smart thermostat 210d still remain further away from the user 30 holding the user device 200 than the smart speaker 210a, thereby resulting in these assistant-enabled devices 210b—d having lower proximity scores 260 than the smart speaker 210a.

With reference to FIGS. 3B and 4B, after determining the proximity scores 260 for each of the assistant-enable devices 210, the user device 200 generates (i.e., using the assistant application 106) a ranked list 310 of candidate assistant-enabled devices 210 and corresponding controls 220 based on the proximity scores 260 indicating proximity estimations of the assistant-enabled devices 210 relative to the user device 200. More specifically, the user device 200 generates the ranked list 310 by ordering the assistant-enabled devices 210 from the assistant-enabled device 210a having the closest proximity relative to the user device 200 to the assistant-enabled device 210d having the furthest proximity relative to the user device 200. In some examples, one or more of the proximity scores 260 are further determined, or biased, based on directionality information 255 associated with one or more of the assistant-enabled devices 210.

The GUI 400b of FIG. 4B displays the ranked list 310 of candidate assistant-enabled devices 210 that the user device 200 generates using the proximity scores 260 determined for each of the assistant-enabled devices 210. As noted above, the user device 200 may determine that the proximity scores 260 associated with the second smart television 210e and the second smart speaker 210f located on the second floor of the user's premises 32 of FIG. 1 may indicate proximity estimations that still satisfy a maximum distance threshold, thereby resulting in the user device 200 discarding these assistant-enabled devices 210e, 210f from the ranked list 310 of candidate assistant-enabled devices 210. As a result of maintaining its highest proximity score 260, the user device 200 ranks the smart speaker 210a higher in the ranked list 310, thereby resulting in the user device 200 rendering the corresponding graphical element 402 representing the smart speaker 210a, the corresponding controls 220, and the device state information 215 in the GUI 400b more prominently than the graphical elements 402 representing each of the lower ranking assistant-enabled devices 210b-d in the ranked list 310. Additionally, the corresponding controls 220 for higher ranking assistant-enabled devices 210 in the ranked list may be displayed more proximately (e.g., larger, more controls, etc.) In the example shown, the user device 200 renders/displays, in the GUI 400b, the graphical elements 402 of the ranked list 310 of candidate assistant-enabled devices 210 and corresponding controls 220 associated with the smart speaker 210a at the top, in a larger font. The GUI 400b is non-limiting, and in other examples, the user device 200 may render the graphical element 402 representing the smart speaker 210a associated with the highest proximity score 260 in other locations of the GUI 400b, such as the middle of the GUI 400b and/or display the graphical element 402 differently than the graphical elements 402 representing the other assistant-enabled devices 210b—d. This display formatting makes it easier for the user 30 to quickly find the respective set of controls 220 for performing the respective set of actions 120 associated with the smart speaker 210a.

With continued reference to the example GUI 400b of FIG. 4B, the respective set of controls 220 for the smart speaker 210a that are displayed in the GUI 400b include controls 220, that when selected, cause the smart speaker 210a to perform respective actions 120 of reverting to a previous song track in the playlist, pausing the music playlist, skipping to a next song track in the playlist, and adjusting a volume level of the smart speaker 210a. Thus, since the device state information 215 for the smart speaker 210a indicates that the smart speaker 210a is now currently playing music from the music playlist (i.e., responsive to the transmission of the command 80 from the user device 200 to the smart speaker 210a to perform the respective "Play" action 120 shown in FIG. 3A), the action 120 to pause the music playlist which was not available as a control 220 in the GUI 400a of FIG. 4A is now currently available for selection in the GUI 400a of FIG. 4B. Continuing with the example, the graphical element 402 representing the smart speaker 210a located in the family room of the user's premises 32 also displays the device state information 215 associated with the smart speaker 210a that indicates the battery level of the smart speaker 210a, and that the music playlist is currently playing, and thus, music is currently being output from the smart speaker 210a. Notably, because the user 30 has provided an input indication indicating selection of the "Play" control 220 in FIG. 3A, a control 220 for performing an action 120 of playing the playlist is not displayed in the GUI 400b since the playlist is currently playing.

Still referring to the GUI 400b of FIG. 4B, the user device 200 further displays, in the GUI 400b, graphical elements 402 representing the other assistant-enabled devices 210b-d in the ranked list 310 of candidate assistant-enabled devices 210. Specifically, the smart thermostat 210d is second in the ranked list 310 due to the smart thermostat 210d having the second highest proximity score 260, the smart television 210c is third in the ranked list 310 due to the smart television 210c having the third highest proximity score 260, and the smart light 210b is last in the ranked list 310 due to smart light 210b having the lowest proximity score 260. In the example shown, the graphical element 402 representing the smart thermostat 210d provides device state information 215 indicating a current temperature setting (e.g., 70-degrees) of the smart thermostat 210d and a respective set of controls 220 for controlling the smart thermostat 210d to perform respective actions 120 of increasing or decreasing the current temperature setting. Similarly, the graphical element 402 representing the smart light 210b provides device state information 215 indicating the smart light 210b is currently off and a single control 220 for controlling the smart light 210b to perform the respective action 120 of turning on.

In the example shown, the user device 200 (i.e., using the application 106) no longer suppresses the display of respective controls 220 for the smart television 210c in the ranked list 310. This decision to now render the display of the respective controls 220 for the smart television 210c may be based on corresponding directionality information 255 now indicating that the user device 200 has turned away from the smart speaker 210a to now face the smart television 210c as shown in the schematic view 300b of FIG. 3B. Here, the directionality information 255 indicating that the user device 200 is pointed toward the smart television 210c may result in the assistant application 106 biasing the proximity score 260 for the smart television 210c by increasing it and/or simply choosing to not apply any biasing to decrease the proximity score 260 as in FIG. 3A when the directionality information 255 indicated that the user device 200 was pointed away from the smart television 210c. In the current example, the directionality information 255 indicating that the user device 200 is facing the smart television 210c can serve as a strong indicator that the user 30 intends to control the smart television 210c. As a result, the user device 200 may optionally render the display of controls 220 for "Off" and "Mute" in the GUI 400b for causing the smart television 210c to perform the actions 120 of powering off the smart television 210c and muting the audio output of the smart television 210c. Moreover, the directionality information 255 indicating that the user device 200 is pointed toward the smart television 210 may result in the smart television 210c providing an indication that the user device 200 is pointed toward the smart television, and thereby serve as confirmation that the assistant application intendeds to control the television. The indication could be the screen changing color, paneling of the television 210c changing color, an audible alert, or any other indication to confirm that the user device 200 is aligned with the television 200c.

While many examples described herein discuss the assistant application 106 using received directionality information 255 to bias proximity scores 260, other examples may include the assistant application 106 determining the proximity scores 260 as a function of both the proximity information 250 and the directionality information 255. In these examples, a type of a particular assistant-enabled device 210 providing the information 250, 255 may be further taken into account when determining a corresponding proximity score 260. For instance, the assistant application 106 may adjust a weight of the proximity information 250 and/or a weight of the directionality information 255 based on the type of the particular assistant-enabled device 210 to influence how much the proximity information 250 and directionality information 255 influences a magnitude of the resulting proximity score 260 for the particular assistant-enabled device 210. In some implementations, the assistant application 106 uses the proximity information 250 and directionality information 255 consecutively received over a duration of time to determine whether or not the user device 200 is moving. In these implementations, when the user device 200 is moving, the assistant application 106 may further derive a current heading of the user device 200 indicating what direction the user device 200 is moving toward, and thus, which assistant-enabled devices 210 the user device 200 is moving toward. The current heading may bias the proximity scores 260 determined for one or more assistant-enabled devices 210, or the proximity scores 260 determined for one or more of the assistant-enabled devices 210 may be determined as a function of the current heading of the user device 200 derived from the proximity information 250 and the directionality information 255.

Additionally, the user device 200 may consider the context of past behavior of the user 30 providing input indications indicating selections of controls 220 for causing assistant-enable devices 210 to perform respective actions 120 based on device state information 215 of one or more of the assistant-enabled devices 210 when considering whether or not to include respective controls 220 for performing available actions 120 associated with one or more assistant-enabled devices 210 in the environment 32 in the GUI 400. For example, if every time the user 30 issued a command 80 for the smart speaker 210a to play music while the device state information 215 of the smart television 210c indicated that the smart television 210c was currently on, the user 30 immediately muted or turned off the smart television 210c, the user device 200 may make the decision to currently render the display of the controls 220 for "Off" and "Mute" in the GUI 400b for the smart television 210c responsive to issuing the command 80 (FIG. 3A) to the smart speaker 210a to play music and the current device state information 215 for the smart television 210c indicating the smart television 210c is currently on.

Referring to FIGS. 3B and 4B, the user 30 wants to switch the smart light 210b from off to on and uses the assistant application 106 to provide a corresponding user input indication (e.g., touch input, speech input, eye gaze, or gesture) indicating selection of the "On" control 220 displayed in the GUI 400b for the smart light 210b. Here, the user device 200 receives the user input indication indicating selection of the "On" control 220 for the smart light 210b displayed in the GUI 400b, causing the user device 200 (i.e., the assistant application 106) to transmit a corresponding command 80 to the smart light 210b to perform the respective action 120 of turning on.

Referring to FIGS. 3C and 4C, the smart light 210b is now turned on and the user 30 has moved from the far-end of the room near the smart speaker 210a toward the opposite side of the room, closest to the smart thermostat 210d, with the smart light 210b and the smart television 210c now in closer proximity to the user device 200 compared to the example depicted in FIG. 3B. The GUI 400c now shows that the device state information 215 for the smart light 210b indicating that the smart light 210b is currently on, thereby rendering only one control 220 for the smart light 210b in the GUI 400c to control the smart light 210b to perform the only available action 120 of turning off. Moreover, FIG. 3C shows that the user device 200 is pointed toward the smart thermostat 210d indicating that the user 30 may likely intend to control the smart thermostat 210d via the assistant application 106. Conversely, the user device 200 is not pointed toward either one of the smart light 210b or the smart television 210c despite their close proximities to the user device 200. Directionality information 255 indicating that the user device 200 is not pointed toward an assistant-enabled device 210 may indicate that the user 30 likely does not intend to control the assistant-enabled device 210, e.g., the smart light 210b, the smart television 210c, and the smart speaker 210a in the example shown.

As discussed above with reference to FIGS. 1 and 2, the user device 200 may continuously (or at periodic intervals) obtain proximity information 250 and optionally directionality information 255 for each of the assistant-enabled devices 210 to determine the proximity score 260 of each of the assistant-enabled devices 210 for generating the ranked list 310 of candidate assistant-enabled devices 210. As shown in FIG. 3C, the smart thermostat 210d is in closest proximity to the user 30 holding the user device 200 whereas the smart speaker 210a has the furthest proximity relative to the user device 200, resulting in the user device 200 initially determining a higher proximity score 260 for the smart thermostat 210d than the smart speaker 210a. As the smart thermostat 210d is the candidate assistant-enabled device 210 in the ranked list 310 with the highest proximity score 260, there is initially a strong indication that the user 30 intends to control the smart thermostat 210d. The smart light 210b and smart television 210c, while closer to the user device 200 than the smart speaker 210a, include further proximities relative to the user device 200 than the smart thermostat 210d, resulting in the user device 200 initially determining proximity scores 260 for the smart television 210c and smart light 210b that are lower than the smart thermostat 210d but higher than the smart speaker 210a. Accordingly, a magnitude of the proximity score 260 may serve as a strong indicator as to whether the user 30 intends to, or does not intend to, control a corresponding candidate assistant-enabled device 210. If using proximity scores 260 determined for the assistant-enabled devices 210a-d in the environment 32 alone, the user device 200 (i.e., using the assistant application 106) may identify the smart thermostat 210d having the highest proximity score 260 among the plurality of assistant-enabled devices 210a—d as a target assistant-enabled device 210 the user 30 intends to control.

Additionally, the user device 200 (i.e., via the assistant application 106) may bias one or more of the proximity scores 260 based on an underlying suggestion confidence associated with one or more of the assistant-enabled devices 210. For example, if the user 30 recently interacted with an assistant-enabled device 210, there may be a high suggestion confidence that the user 30 seeks to continue to control the assistant-enabled device 210. In this example, the user device 200 may apply the suggestion confidence to bias the proximity score 260 by increasing the proximity score 260 associated with the corresponding assistant-enabled device 210. Conversely, if the user 30 has not interacted with an assistant-enabled device 210 for a threshold period of time, there may be a low suggestion confidence that the user 30 seeks to control the assistant-enabled device 210, thereby causing the user device 200 to bias the proximity score 260 associated with that corresponding assistant-enabled device 210 by decreasing/lowering/reducing it. In the example shown, the user device 200 obtains a high suggestion confidence associated with the smart speaker 210a that indicates the user 30 may seek to continue to control the smart speaker 210a since the user device 200 recently interacted with the smart speaker 210a in FIGS. 3A and 4A by selecting the "Play" control 220 in the GUI 400a to issue the command 80 from the user device 200 for causing the smart speaker 210a to perform the respective action 120 to play the music playlist. As a result, and despite the smart speaker 210a having the furthest proximity relative to the user device 200 and the directionality information 255 indicating the user device 200 is pointed away from the smart speaker 210a, the user device 200 may apply the high suggestion confidence by increasing the proximity score 260 associated with the smart speaker 210a. Here, the user device 200 (i.e., using the assistant application 106) maintains the smart speaker 210a and the respective set of controls 220 highest in the ranked list 310 of candidate assistant-enabled devices rendered in the GUI 400c of FIG. 4C. In other examples, the high suggestion confidence indicating that the user 30 intends to control a particular assistant-enabled device 210 independent of the proximity information 250 and directionality information 255 of the particular assistant-enabled device 210 relative to the user device 200, results in the assistant application 106 simply overriding the proximity score 260 determined for the particular assistant-enabled device 210 such that the particular assistant-enabled device 210 is ranked highest in the ranked list 310. Similarly, low suggestion confidences for the user 30 intending to control particular assistant-enabled devices 210 may simply cause the assistant application 106 to override the associated proximity scores 260 of the particular assistant-enabled devices 210 so that they are at least ranked lower in the ranked list 310 or rendered for display in the GUI 400 less prominently. In fact, low suggestion confidences may result in simply discarding the assistant-enabled device 210 from the ranked list 310 of candidate assistant-enabled devices 210 altogether.

Moreover, the user device 200 may discard any assistant-enabled device 210 after determining that the proximity scores 260 indicate proximity estimations that satisfy (e.g., are less than) a minimum distance threshold. Here, the minimum distance threshold is configured to filter out any assistant-enabled device 210 having a proximity score 260 that indicates the assistant-enabled device 210 is close enough to the user device 200 such that the user 30 would manually control the assistant-enabled device 210 directly without using the application 106. In the example shown in FIG. 3C, the proximity score 260 associated with the smart thermostat 210d indicates a proximity estimation that satisfies (e.g., is less than) the minimum distance threshold, thereby resulting in the user device 200 discarding the smart thermostat 210d from the ranked list 310 of candidate assistant-enabled devices 210 rendered in the GUI 400c of FIG. 4C.

The GUI 400c of FIG. 4C displays the ranked list 310 of candidate assistant-enabled devices 210 that the user device 200 generates using the proximity scores 260 determined for each of the assistant-enabled devices 210. As noted above, the user device 200 may determine that the proximity score 260 associated with the smart thermostat 210d indicates a proximity estimation that fails to exceed a minimum distance threshold, thereby resulting in the user device 200 discarding this assistant-enabled device 210d from the ranked list 310 of candidate assistant-enabled devices 210. On the other hand, the recent interaction with the smart speaker 210a in FIG. 3A may increase the proximity score 260 associated with the smart speaker 210a to result in the smart speaker 210a having the highest ranking in the ranked list 310. Accordingly, the user device 200 may continue to render, in the GUI 400c, the graphical element 402 representing the smart speaker 210a and the respective set of controls 220 more prominently (e.g., at the top of the ranked list 310 and in larger font) than the graphical elements 402 representing the other assistant-enabled devices 210 in the ranked list 310. The GUI 400c is non-limiting, and in other examples, the user device 200 may render the graphical element 402 representing the smart speaker 210a associated with the highest proximity score 260 in other locations of the GUI 400c such as the middle and/or display the graphical element 402 differently than the graphical elements 402 representing the other assistant-enabled devices 210b, 210c. This display formatting makes it easier for the user 30 to quickly find the respective set of controls 220 for performing the respective set of actions 120 associated with the smart speaker 210a.

The user device 200 also displays, in the GUI 400c, corresponding graphical elements 402 representing the other assistant-enabled devices 210b, 210c in the ranked list 310 of candidate assistant-enabled devices 210. Specifically, the smart television 210c is second in the ranked list 310 due to the smart television 210c having the second highest proximity score 260 (e.g., after increasing the proximity score 260 associated with the smart speaker 210a and discarding the smart thermostat 210d from the ranked list 310). The smart light 210b is third in the ranked list 310 due to the smart light 210b having the third highest proximity score 260. In the example GUI 400c of FIG. 4C, the graphical element 402 representing the smart television 210c provides the same device state information 215 as in the GUI 400b of FIG. 4B by indicating the smart television 210c is currently on and the same respective set of controls 220 for controlling the smart television 210c to perform respective actions 120 of turning off or muting the smart television 210c.

FIG. 5 is a flowchart of an example arrangement of operations for a method 500 of controlling assistant-enabled devices. At operation 510, the method 500 includes obtaining, by data processing hardware 202 of a user device 200, proximity information 250 for each of a plurality of assistant-enable devices 210 within an environment 32 of the user device 200. Examples of proximity information 250 for the at least one assistant-enabled device 210 includes any information or data that the user device 200 may use to determine a proximity score 260 for the corresponding assistant-enabled device 210, whereby the proximity score 260 indicates a proximity estimation of the corresponding assistant-enabled device 210 relative to the user device 200 in the environment 32. Each assistant-enabled device 210 of the plurality of assistant-enabled devices 210 is controllable by an assistant application 106 to perform a respective set of available actions 120 associated with the assistant-enabled device 210. For example, the respective set of available actions 120 for a smart speaker 210a may include one or more of reverting to a previous song track in the playlist, playing the music playlist, pausing the playlist, skipping to a next song track in the playlist, and adjusting a volume level of the smart speaker 210a.

At operation 520, the method 500 includes, for each assistant-enabled device 210 of the plurality of assistant-enabled devices 210, determining, by the data-processing hardware 202, the proximity score 260 based on the proximity information 250 obtained for the corresponding assistant-enabled device 210. The proximity score 260 indicates the proximity estimation of the corresponding assistant-enabled device 210 relative to the user device 200 in the environment 32. The proximity estimation may indicate a distance the corresponding assistant-enabled device 210 is located from the user device 200 and/or include a location of the corresponding assistant-enabled device 210 relative to a location of the user device 200.

At operation 530, the method 500 also includes generating, by the data processing hardware 202, using the plurality of proximity scores 260 determined for the plurality of assistant-enabled devices 210, a ranked list 310 of candidate assistant-enabled devices 210 from the plurality of assistant-enabled devices 210. In some examples, the method 500 generates the ranked list 310 of candidate assistant-enabled devices 210 by ordering the assistant-enabled devices 210 from the assistant-enabled device 210 having the closest proximity relative to the user device 200 to the assistant-enabled device 210 having the furthest proximity relative to the user device 200. The ranked list 310 of candidate assistant-enabled devices 210 may include the assistant-enabled devices 210 having the N-highest proximity scores 260 among the plurality of proximity scores 260 determined from the plurality of assistant-enabled devices 210. Additionally, generating the ranked list 310 of candidate assistant-enabled devices 210 may further include discarding any assistant-enabled devices 210 from the ranked list 310 of candidate assistant-enabled devices 210 that include proximity scores 260 indicating proximity estimations that satisfy a maximum distance threshold (i.e., are too far away from the user device 200) and/or that satisfy a minimum distance threshold (i.e., are too close to the user device 200).

At operation 540, the method 500 also includes, for each of the one or more corresponding assistant-enabled devices 210 in the ranked list 310 of candidate assistant-enabled devices 210, displaying, by the data processing hardware 202, in a graphical user interface (GUI) 400 displayed on a screen of the user device 200 in communication with the data processing hardware 202, a respective set of controls 220 for performing the respective set of actions 120 associated with the corresponding assistant-enabled device 210. For each candidate assistant-enabled device 210, the user device 200 may render a corresponding graphical element 402 representing the candidate assistant-enabled device 210, its corresponding controls 220, and/or device state information 215 in the GUI 400. Moreover, the method 500 of displaying, in the GUI 400, the respective set of controls 220 for performing the respective set of actions 120 associated with the corresponding assistant-enabled device 210 may include re-ranking the candidate assistant-enabled devices 210 in the ranked list 310 of candidate assistant-enabled devices 210 responsive to receiving device state information 215 associated with at least one of the assistant-enabled devices 210. Additionally, or alternatively, the method 500 for displaying the respective set of controls 220 for performing the respective set of actions 120 may include displaying the respective set of controls 220 for one assistant-enabled device 210 differently than the respective set of controls 220 displayed in the GUI 400 for the other assistant-enabled devices 210. For example, the assistant-device 210 with the highest proximity score 260 and rated highest in the ranked list 310 may be displayed more prominently in the GUI 400 than other assistant-enabled devices 210 with lower proximity scores 260.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
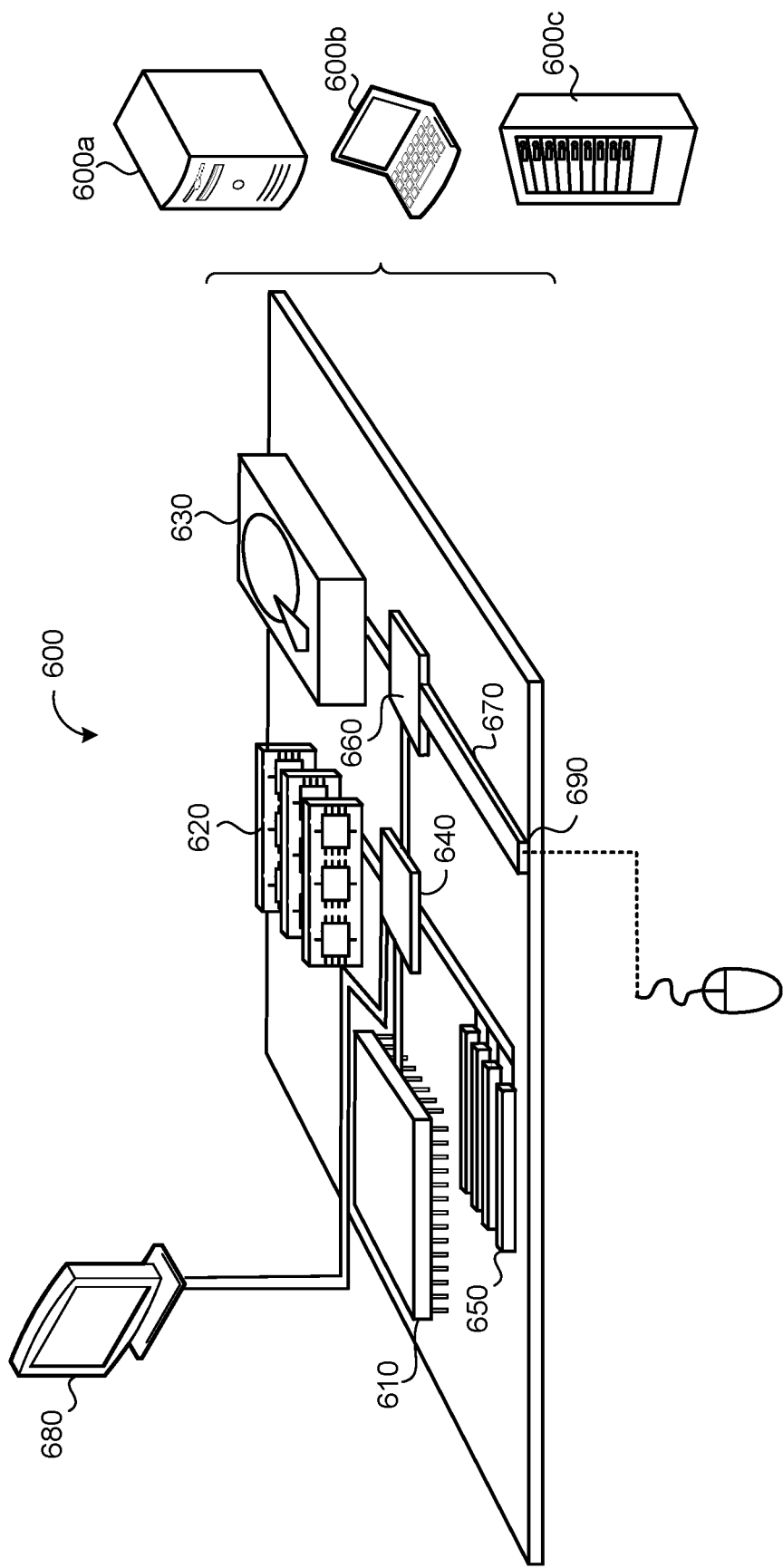
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware of a user device causes the data processing hardware to perform operations comprising:
    initiating, using an assistant application executing on the data processing hardware of the user device, communication with each of a plurality of assistant-enabled devices via a network, each assistant-enabled device of the plurality of assistant-enabled devices located within a home of a user of the user device and controllable by the assistant application to perform a respective set of available actions associated with the assistant-enabled device;
    receiving a current context of the user device;
    based on the current context of the user device, automatically detecting a list of candidate assistant-enabled devices amongst the plurality of assistant-enabled devices that the user wants to control using the assistant application;
    determining a current time of day; and
    for each candidate assistant-enabled device in the list of candidate assistant-enabled devices:
        determining a respective confidence level for the respective set of available actions associated with the candidate assistant-enabled device based on the current time of day; and
        displaying, in a graphical user interface (GUI) displayed on a screen of the user device, a graphical element representing the candidate assistant-enabled device based on the respective confidence level,
    wherein, while displaying the list of candidate assistant-enabled devices in the GUI, a respective graphical element of the one of the candidate assistant-enabled devices having the highest respective confidence level is displayed in the GUI in a larger size than the respective graphical elements of the other candidate assistant-enabled devices displayed in the GUI.

2. The method of claim 1, wherein the operations further comprise:
    receiving a user request to launch the assistant application for execution on the user device; and
    executing the assistant application on the user device in response to receiving the user request.

3. The method of claim 2, wherein receiving the user request comprises receiving a user input indication indicating selection of a graphical element displayed in the GUI that represents the assistant application.

4. The method of claim 2, wherein receiving the user request comprises receiving a speech input from the user, the speech input comprising an invocation command to launch the assistant application for execution on the user device.

5. The method of claim 1, wherein the graphical element of the one of the candidate assistant-enabled devices displayed in the GUI in a larger size than the respective graphical elements of the other candidate assistant-enabled devices is located at a middle of the screen of the user device.

6. The method of claim 1, wherein the graphical element of the one of the candidate assistant-enabled devices displayed in the GUI in a larger size than the respective graphical elements of the other candidate assistant-enabled devices comprises a larger font than a font of the respective graphical elements of the other candidate assistant-enabled devices displayed in the GUI.

7. The method of claim 1, wherein the operations further comprise:
    receiving from each assistant-enabled device of the plurality of assistant-enabled devices, a respective set of available actions associated with the corresponding assistant-enabled device; and
    for each corresponding assistant-enabled device in the list of candidate assistant-enabled devices, determining a respective set of controls for performing the respective set of available actions associated with the corresponding assistant-enabled device.

8. The method of claim 7, wherein the operations further comprise:
    receiving, at the data processing hardware, from at least one assistant-enabled device of the plurality of assistant-enabled devices, device state information associated with the corresponding assistant-enabled device,
    wherein determining the respective set of controls for performing the respective set of available actions associated with the corresponding assistant-enabled device is further based on the device state information associated with the corresponding assistant-enabled device.

9. The method of claim 1, wherein the assistant application is installed on the user device prior to the user purchasing the user device.

10. The method of claim 1, wherein the user device comprises a smart watch.

11. A user device comprising:
    data processing hardware; and
    memory hardware in communication with the data processing hardware and storing instructions that when executed on the data processing hardware cause the data processing hardware to perform operations comprising:
        initiating, using an assistant application executing on the data processing hardware of the user device, communication with each of a plurality of assistant-enabled devices via a network, each assistant-enabled device of the plurality of assistant-enabled devices located within a home of a user of the user device and controllable by the assistant application to perform a respective set of available actions associated with the assistant-enabled device;
        receiving a current context of the user device;

based on the current context of the user device, automatically detecting a list of candidate assistant-enabled devices amongst the plurality of assistant-enabled devices that the user wants to control using the assistant application;

determining a current time of day; and for each candidate assistant-enabled device in the list of candidate assistant-enabled devices;

determining a respective confidence level for the respective set of available actions associated with the candidate assistant-enabled device based on the current time of day; and displaying, in a graphical user interface (GUI) displayed on a screen of the user device, a graphical element representing the candidate assistant-enabled device based on the respective confidence level, wherein, while displaying the list of candidate assistant-enabled devices in the GUI, a respective graphical element of the one of the candidate assistant-enabled devices having the highest respective confidence level is displayed in the GUI in a larger size than the respective graphical elements of the other candidate assistant-enabled devices displayed in the GUI.

12. The user device of claim 11, wherein the operations further comprise:

receiving a user request to launch the assistant application for execution on the user device; and executing the assistant application on the user device in response to receiving the user request.

13. The user device of claim 12, wherein receiving the user request comprises receiving a user input indication indicating selection of a graphical element displayed in the GUI that represents the assistant application.

14. The user device of claim 12, wherein receiving the user request comprises receiving a speech input from the user, the speech input comprising an invocation command to launch the assistant application for execution on the user device.

15. The user device of claim 11, wherein the graphical element of the one of the candidate assistant-enabled devices displayed in the GUI in a larger size than the respective graphical elements of the other candidate assistant-enabled devices is located at a middle of the screen of the user device.

16. The user device of claim 11, wherein the graphical element of the one of the candidate assistant-enabled devices displayed in the GUI in a larger size than the respective graphical elements of the other candidate assistant-enabled devices comprises a larger font than a font of the respective graphical elements of the other candidate assistant-enabled devices displayed in the GUI.

17. The user device of claim 11, wherein the operations further comprise:

receiving from each assistant-enabled device of the plurality of assistant-enabled devices, a respective set of available actions associated with the corresponding assistant-enabled device; and for each corresponding assistant-enabled device in the list of candidate assistant-enabled devices, determining a respective set of controls for performing the respective set of available actions associated with the corresponding assistant-enabled device.

18. The user device of claim 17, wherein the operations further comprise:

receiving from at least one assistant-enabled device of the plurality of assistant-enabled devices, device state information associated with the corresponding assistant-enabled device, wherein determining the respective set of controls for performing the respective set of available actions associated with the corresponding assistant-enabled device is further based on the device state information associated with the corresponding assistant-enabled device.

19. The user device of claim 11, wherein the assistant application is installed on the user device prior to the user purchasing the user device.

20. The user device of claim 11, wherein the user device comprises a smart watch.

* * * * *